(12) United States Patent
Inoue

(10) Patent No.: US 8,885,113 B2
(45) Date of Patent: Nov. 11, 2014

(54) DISPLAY DEVICE, BARRIER DEVICE, AND METHOD OF MANUFACTURING BARRIER DEVICE

(75) Inventor: Yuichi Inoue, Kanagawa (JP)

(73) Assignee: Sony Corporation (JP)

( * ) Notice: Subject to any disclaimer, the term of this patent is extended or adjusted under 35 U.S.C. 154(b) by 333 days.

(21) Appl. No.: 13/480,994

(22) Filed: May 25, 2012

(65) Prior Publication Data

US 2012/0306864 A1    Dec. 6, 2012

(30) Foreign Application Priority Data

Jun. 6, 2011    (JP) .................. 2011-126563

(51) Int. Cl.
| | | |
|---|---|---|
| G02F 1/1335 | (2006.01) | |
| G02F 1/1343 | (2006.01) | |
| G06T 15/00 | (2011.01) | |
| G09G 3/36 | (2006.01) | |
| G02B 27/22 | (2006.01) | |
| H04N 13/04 | (2006.01) | |

(52) U.S. Cl.
CPC ........ *G02B 27/2214* (2013.01); *H04N 13/0409* (2013.01); *H04N 13/0415* (2013.01); *H04N 13/0447* (2013.01)
USPC ................ 349/15; 349/139; 345/419; 345/98

(58) Field of Classification Search
CPC ............ G02F 1/1343; G02F 1/136289; G02F 1/133707; G02F 1/134336; G02F 1/134363; G02F 1/1345; G06T 19/00; G06T 17/20; G06T 17/00; G06T 15/00; G06T 15/10; H04N 13/0404; H04N 13/0434; H04N 13/0409; G02B 27/2214; G02B 27/26; G09G 3/3688; G09G 3/3648; G09G 2310/027
USPC ............................. 349/15, 139; 345/419, 98
See application file for complete search history.

(56) References Cited

U.S. PATENT DOCUMENTS 7,786,953 B2 *    8/2010    Saishu .............................. 345/4
8,659,586 B2 *    2/2014    Kadowaki ..................... 345/208

FOREIGN PATENT DOCUMENTS

| JP | 03-119889 | 5/1991 |
|---|---|---|
| JP | 2008-216423 | 9/2009 |
| JP | 2011-022491 | 2/2011 |

* cited by examiner

*Primary Examiner* — Mike Qi
(74) *Attorney, Agent, or Firm* — Sheridan Ross P.C.

(57) ABSTRACT

A display device includes a display section displaying an image; and a barrier section including a plurality of liquid crystal barriers, the liquid crystal barriers each being configured to be switched between an open state and a closed state. The barrier section includes a barrier electrode being arranged in a region corresponding to the liquid crystal barrier, the barrier electrode including a plurality of sub-electrodes each of which includes a projection portion, a common electrode being commonly formed on an entire surface of a region corresponding to the plurality of liquid crystal barriers, and a liquid crystal layer being provided between the barrier electrode and the common electrode.

14 Claims, 24 Drawing Sheets

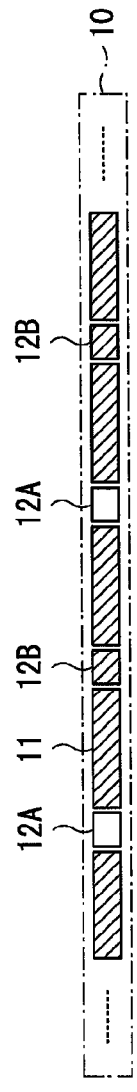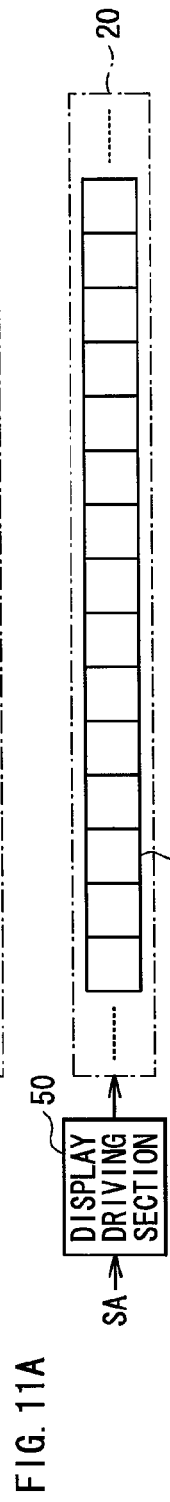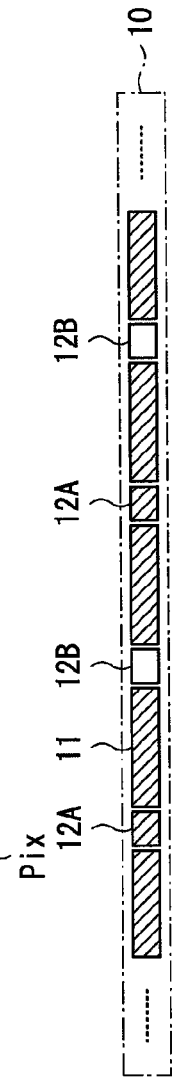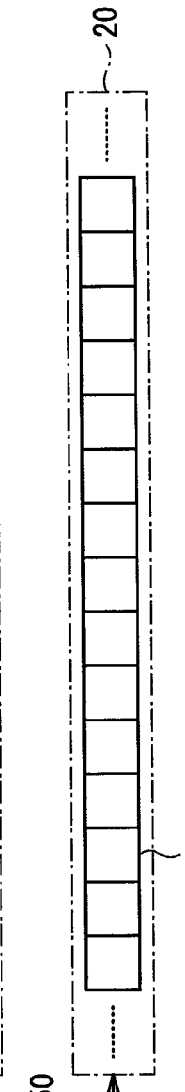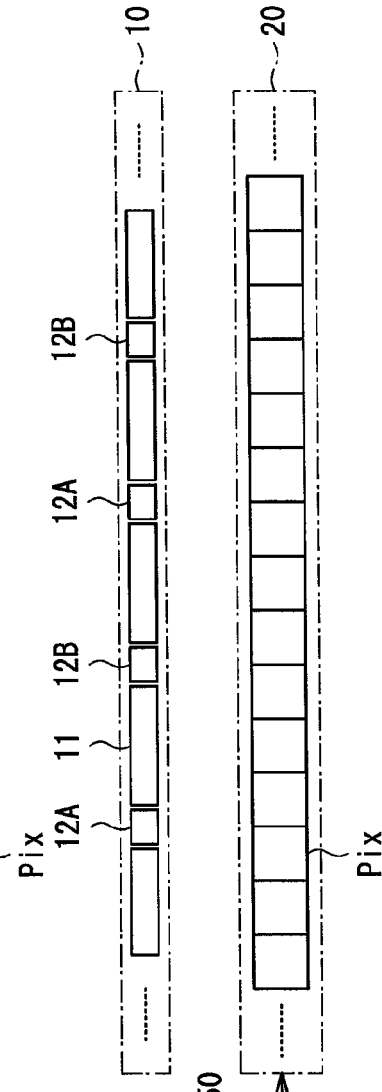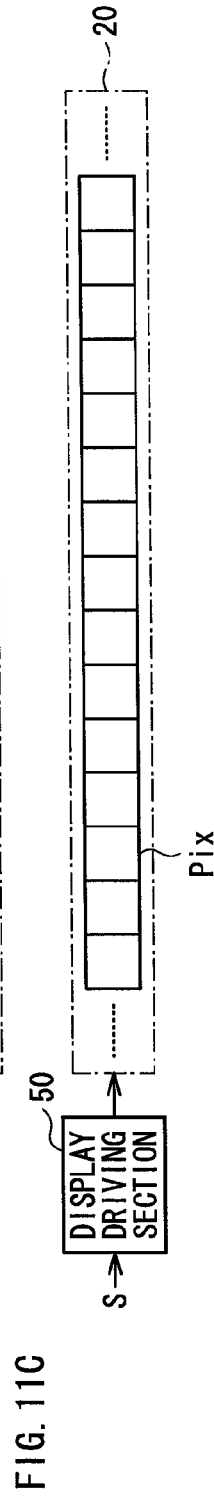
FIG. 11A  FIG. 11B  FIG. 11C

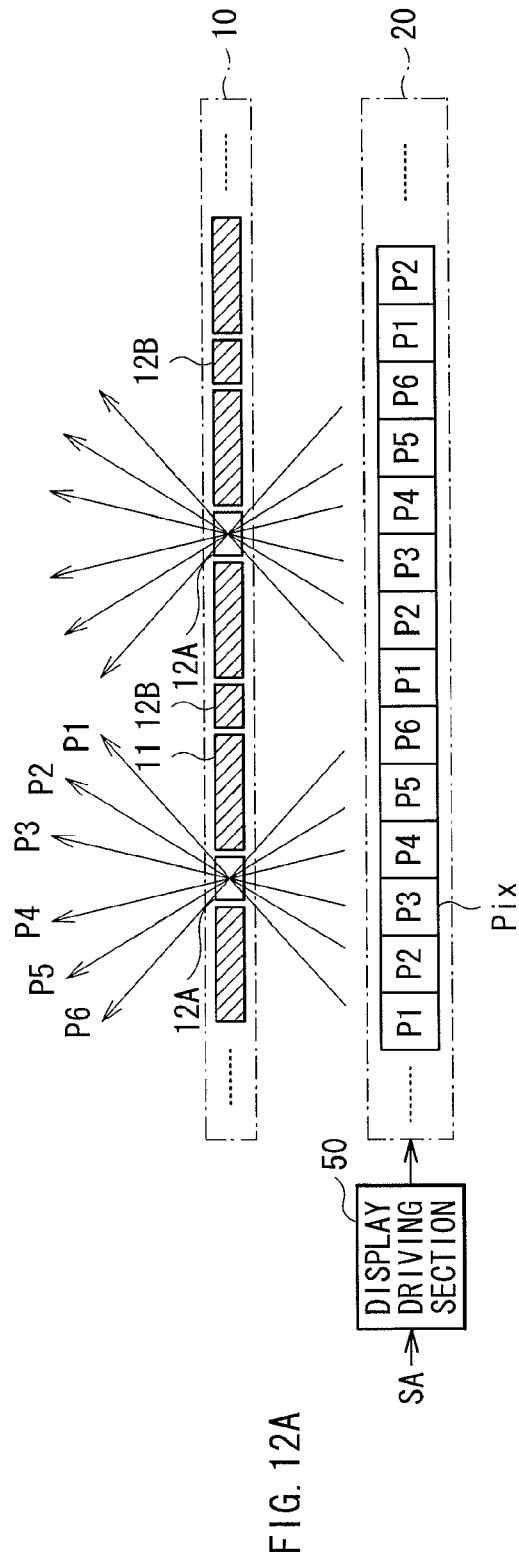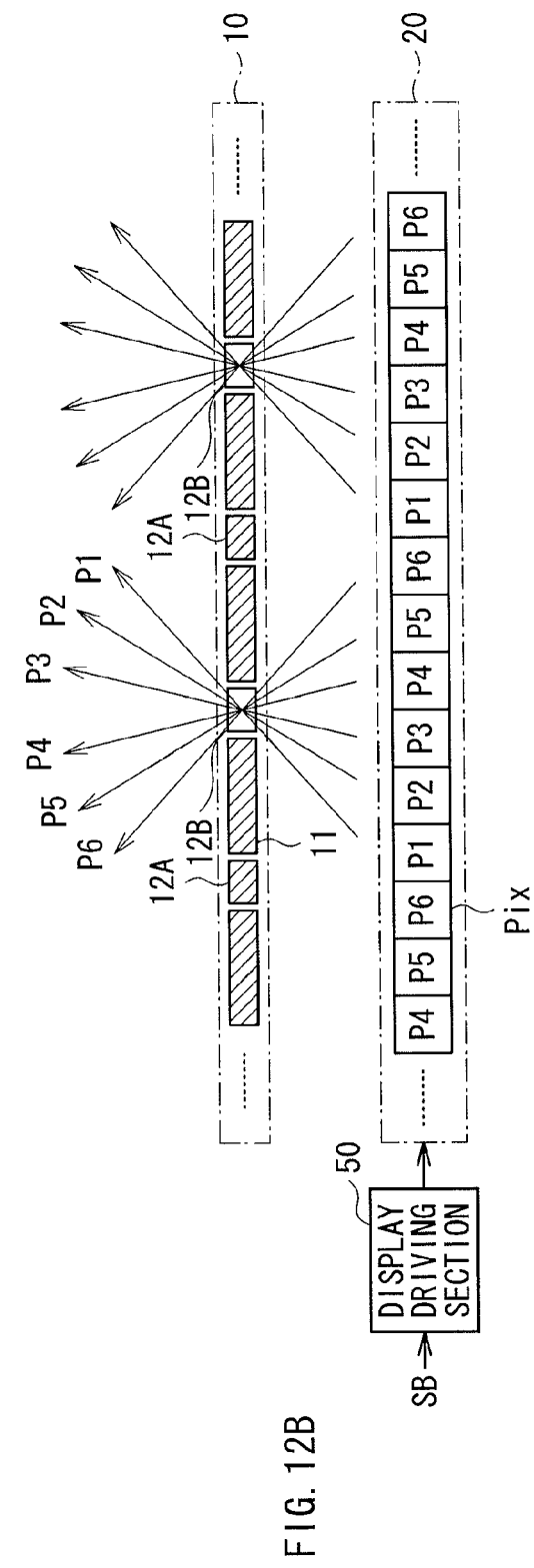

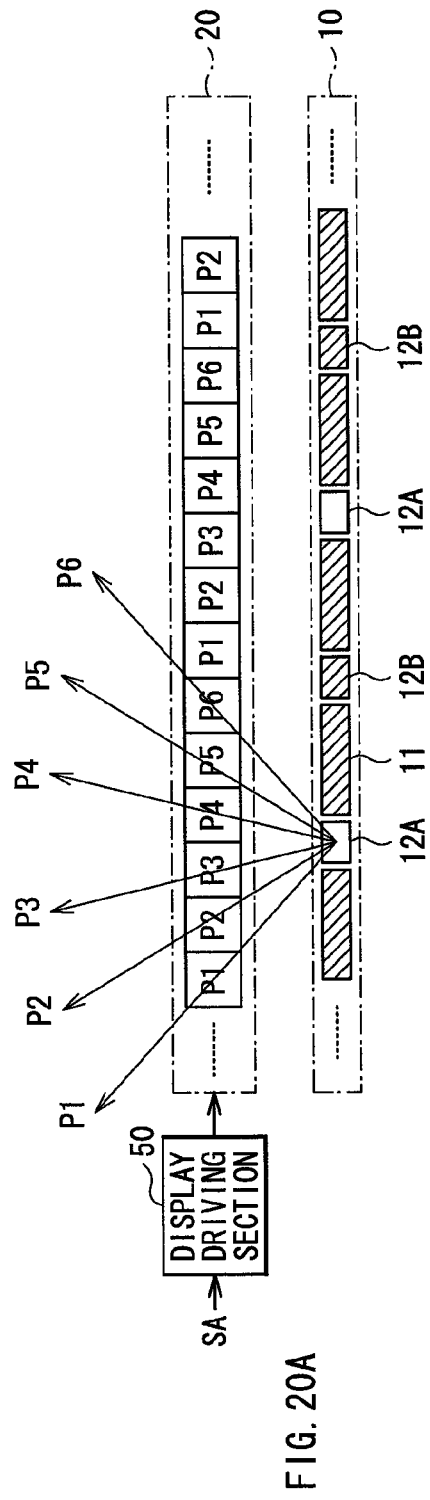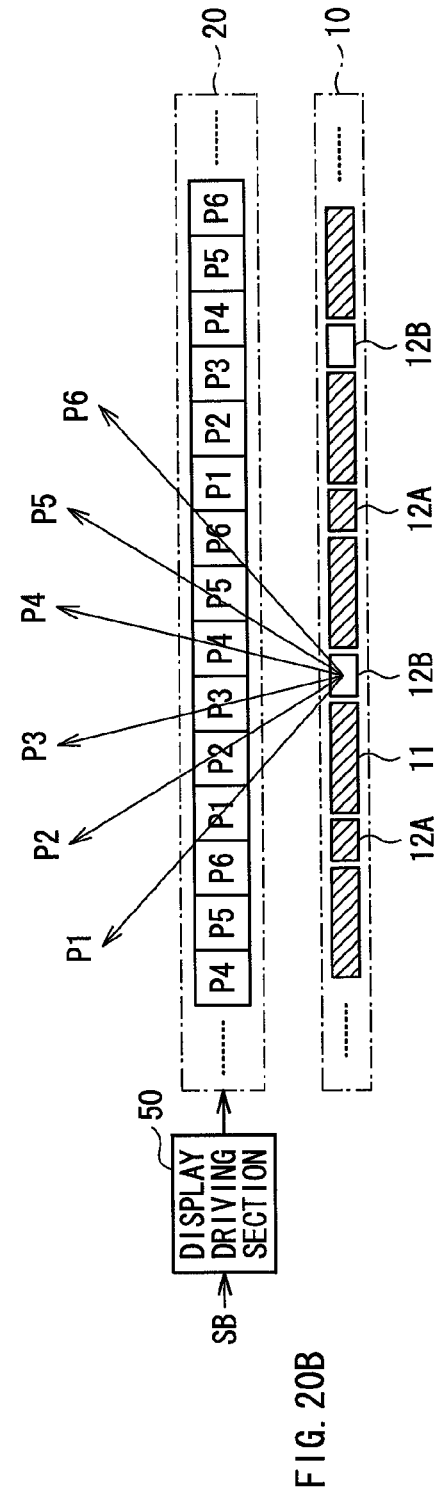

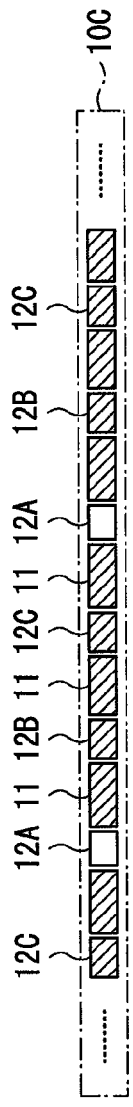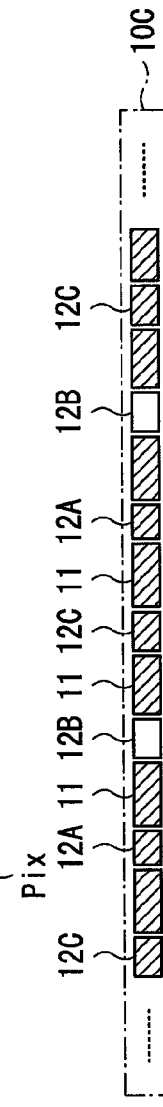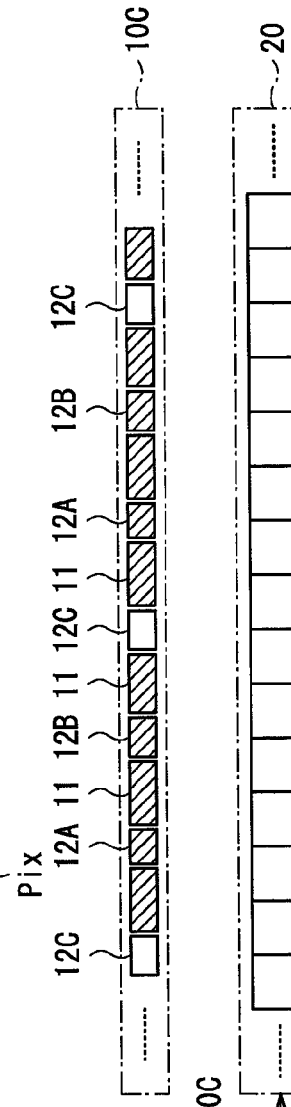
FIG. 21A
FIG. 21B
FIG. 21C 61A  61B 62A  62B

DISPLAY DEVICE, BARRIER DEVICE, AND METHOD OF MANUFACTURING BARRIER DEVICE

BACKGROUND

The present disclosure relates to a display device of a parallax barrier type which enables stereoscopic display, a barrier device to be used for such a display device, and a method of manufacturing the barrier device.

In recent years, display devices for realizing stereoscopic display have been attracting interest. The stereoscopic display is performed by displaying parallax images (or different perspective images) for right and left eyes. When seeing these images with the corresponding eyes, the viewer recognizes the images as a stereoscopic image having a depth. Moreover, another type of display devices which present the viewer with a more natural three-dimensional image by displaying more than two parallax images has been developed.

Such display devices are classified into two types: one requires dedicated glasses, and the other does not require the dedicated glasses. Since wearing dedicated glasses may be troublesome for the viewer, the glasses-free type is preferable. Examples of a technique for realizing glasses-free display devices include the lenticular lens technique and the parallax barrier technique. In these techniques, multiple parallax images (perspective images) are displayed at the same time, thereby presenting the viewer with an image that is changed depending on a relative distance (or angle) between the display device and the eye point of the viewer. An example of display devices of a parallax barrier type is disclosed in Japanese Unexamined Patent Application Publication No. H03-119889, and this display device is equipped with a liquid crystal element as a barrier.

When a liquid crystal element is applied to a display device, it is desirable that liquid crystal molecules in the liquid crystal element be oriented readily in a desired direction. Japanese Unexamined Patent Application Publication Nos. 2011-22491 and 2008-216423 disclose examples of such a liquid crystal display device. These display devices are provided with openings or projections in pixel electrodes in order to orient liquid crystal molecules readily.

SUMMARY

Generally, in an electronic device, the reduction in the number of manufacturing processes is in demand, for example, in terms of manufacturing costs. Likewise, the simple manufacturing processes are expected in the field of display devices.

It is desirable to provide a display device, a barrier device, and a method of manufacturing the barrier device, which make it possible to simplify manufacturing processes.

A display device according to an embodiment of the present disclosure includes: a display section displaying an image; and a barrier section including a plurality of liquid crystal barriers, the liquid crystal barriers each being configured to be switched between an open state and a closed state. The barrier section includes a barrier electrode being arranged in a region corresponding to the liquid crystal barrier, the barrier electrode including a plurality of sub-electrodes each of which includes a projection portion, a common electrode being commonly formed on an entire surface of a region corresponding to the plurality of liquid crystal barriers, and a liquid crystal layer being provided between the barrier electrode and the common electrode.

A barrier device according to an embodiment of the present disclosure includes: a barrier electrode being arranged in a region corresponding to each of a plurality of liquid crystal barriers which are configured to be switched between an open state and a closed state, the barrier electrode including a plurality of sub-electrodes each of which includes a projection portion; a common electrode being commonly formed on an entire surface of a region corresponding to the plurality of liquid crystal barriers; and a liquid crystal layer being provided between the barrier electrode and the common electrode.

A method of manufacturing a barrier device according to an embodiment of the present disclosure includes: forming a drive substrate, the forming a drive substrate including forming a barrier electrode including a plurality of sub-electrodes; forming a counter substrate; and sealing a liquid crystal layer between the drive substrate and the counter substrate. The forming the drive substrate includes forming a plurality of signal lines on a support substrate, selectively forming an insulating layer, and forming the barrier electrode and a lead-in line on a layer differing from a layer in which the signal lines are formed, the lead-in line being formed from the signal lines to the barrier electrode, and the forming the insulating layer includes forming the insulating layer on an intersecting portion of the signal lines and the lead-in line, and on part of a region corresponding to each sub-electrode.

The display device, the barrier device, and the method of manufacturing the barrier device according to the embodiments of the present disclosure allow the liquid crystal barriers to be the light transmitting state, so that a viewer sees an image displayed on the display section. Each sub-electrode is provided with the projection portion which allows the liquid crystal molecules in the liquid crystal barrier to be oriented readily.

According to the display device, the barrier device, and the method of manufacturing the barrier device of the embodiments of the present disclosure, it is possible to simplify the manufacturing processes by providing each sub-electrode with the projection portion.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 11A, 11B, and 11C are schematic diagrams depicting a relationship between the display section and the liquid crystal barrier section shown in FIG. 1.

FIGS. 12A and 12B are schematic diagrams depicting an example of an operation of the display section and the liquid crystal barrier section shown in FIG. 1.

FIGS. 20A and 20B are schematic diagrams depicting an example of an operation of a display section and a liquid crystal barrier section shown in FIG. 19.

FIGS. 21A, 21B, and 21C are schematic diagrams depicting a relationship between a display section and a liquid crystal barrier section according to another modification.

DETAILED DESCRIPTION

Thereinafter, an embodiment of the present disclosure will be described in detail, with reference to the accompanying drawings.

Embodiment (Exemplary Configuration)
(Exemplary Whole Configuration)

Figure 1:
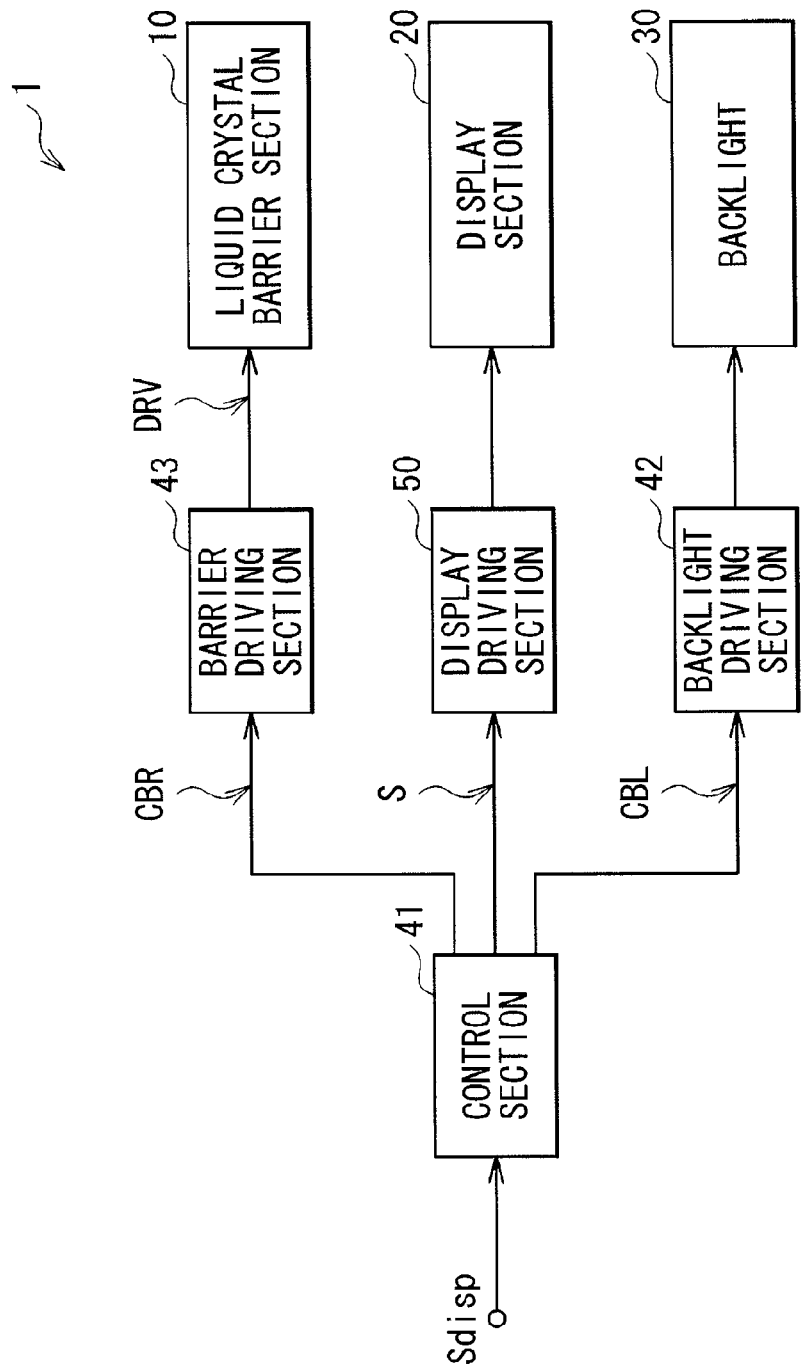
FIG. 1 is a block diagram depicting an example of a configuration of a stereoscopic display device according to an embodiment of the present disclosure.

FIG. 1 is a diagram depicting an example of a configuration of a stereoscopic display device 1 according to an embodiment of the present disclosure. The stereoscopic display device 1 is of a parallax barrier type equipped with a liquid crystal barrier. Note that a configuration of a barrier device according to the embodiment of the present disclosure and a driving method thereof are embodied in this embodiment, and therefore, will be explained together with the configuration of the stereoscopic display device 1. The stereoscopic display device 1 includes a control section 41, a backlight driving section 42, a backlight 30, a display driving section 50, a display section 20, a barrier driving section 43, and a liquid crystal barrier section 10.

The control section 41 is a circuit that supplies respective control signals to the backlight driving section 42, the display driving section 50, and the barrier driving section 43, on the basis of an image signal Sdisp supplied from an external source, thereby controlling the backlight driving section 42, the display driving section 50, and the barrier driving section 43 so as to operate in synchronization with one another. Specifically, the control section 41 supplies a backlight control signal CBL, an image signal S based on the image signal Sdisp, and a barrier control signal CBR to the backlight driving section 42, the display driving section 50, and the barrier driving section 43, respectively. In this embodiment, the image signal S includes image signals SA and SB, each of which contains multiple ("six" in this embodiment) perspective images when the stereoscopic display device 1 performs stereoscopic display, as will be described hereinafter.

The backlight driving section 42 drives the backlight 30 on the basis of the backlight control signal CBL supplied from the control section 41. The backlight 30 has a function of emitting surface-emitting light toward the display section 20. This backlight 30 may include, for example, LEDs (light emitting diodes), CCFLs (cold cathode fluorescent lamps), or some other suitable light sources.

The display driving section 50 drives the display section 20 on the basis of the image signal S supplied from the control section 41. The display section 20 corresponds to a liquid crystal display section in this embodiment, and drives a liquid crystal display element to modulate light emitted from the backlight 30, thereby performing display.

The barrier driving section 43 generates a barrier driving signal DRV (barrier driving signals DRV11, DRV12A, and DRV12B (described hereinafter)) on the basis of the barrier control signal CBR to be supplied from the control section 41, and supplies this barrier driving signal DRV to the liquid crystal barrier section 10. The liquid crystal barrier section 10 allows light, which has been emitted from the backlight 30 and has passed through the display section 20, to transmit therethrough (open operation) or to be blocked (close operation). In addition, the liquid crystal barrier section 10 has multiple opening-closing sections 11 and 12 (described hereinafter) including liquid crystal.

Figure 2A:
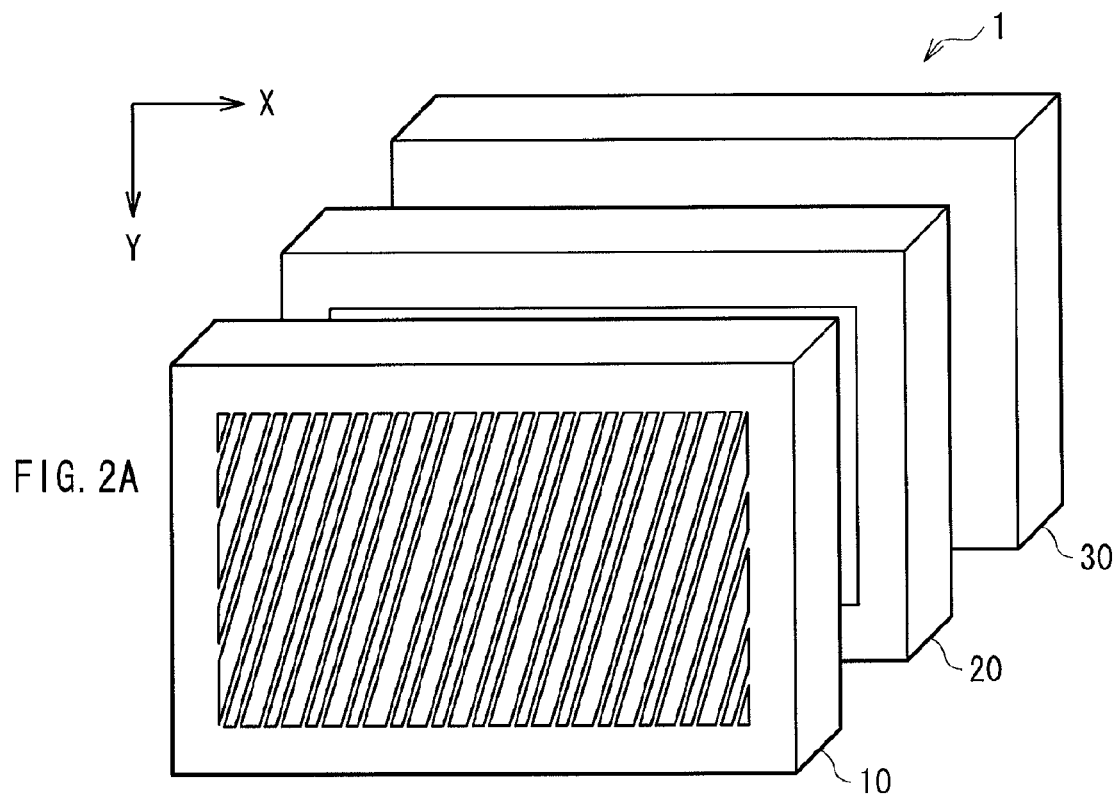
FIGS. 2A and 2B are explanatory diagrams depicting an example of a configuration of the stereoscopic display device shown in FIG. 1.
Figure 2B:
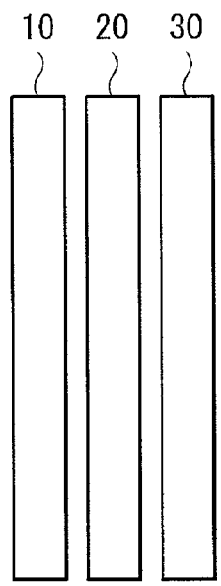

FIGS. 2A and 2B are diagrams depicting an example of a configuration of main parts of the stereoscopic display device 1. Specifically, FIG. 2A is an exploded perspective view depicting the configuration of the stereoscopic display device 1, and FIG. 2B is a side view depicting the configuration thereof. As shown in FIGS. 2A and 2B, the components of the stereoscopic display device 1, namely, the backlight 30, the display section 20, and the liquid crystal barrier section 10 are arranged in this order. In this configuration, light emitted from the backlight 30 passes through the display section 20 and the liquid crystal barrier section 10, and then reaches a viewer.

(Display Driving Section 50 and Display Section 20)

Figure 3:
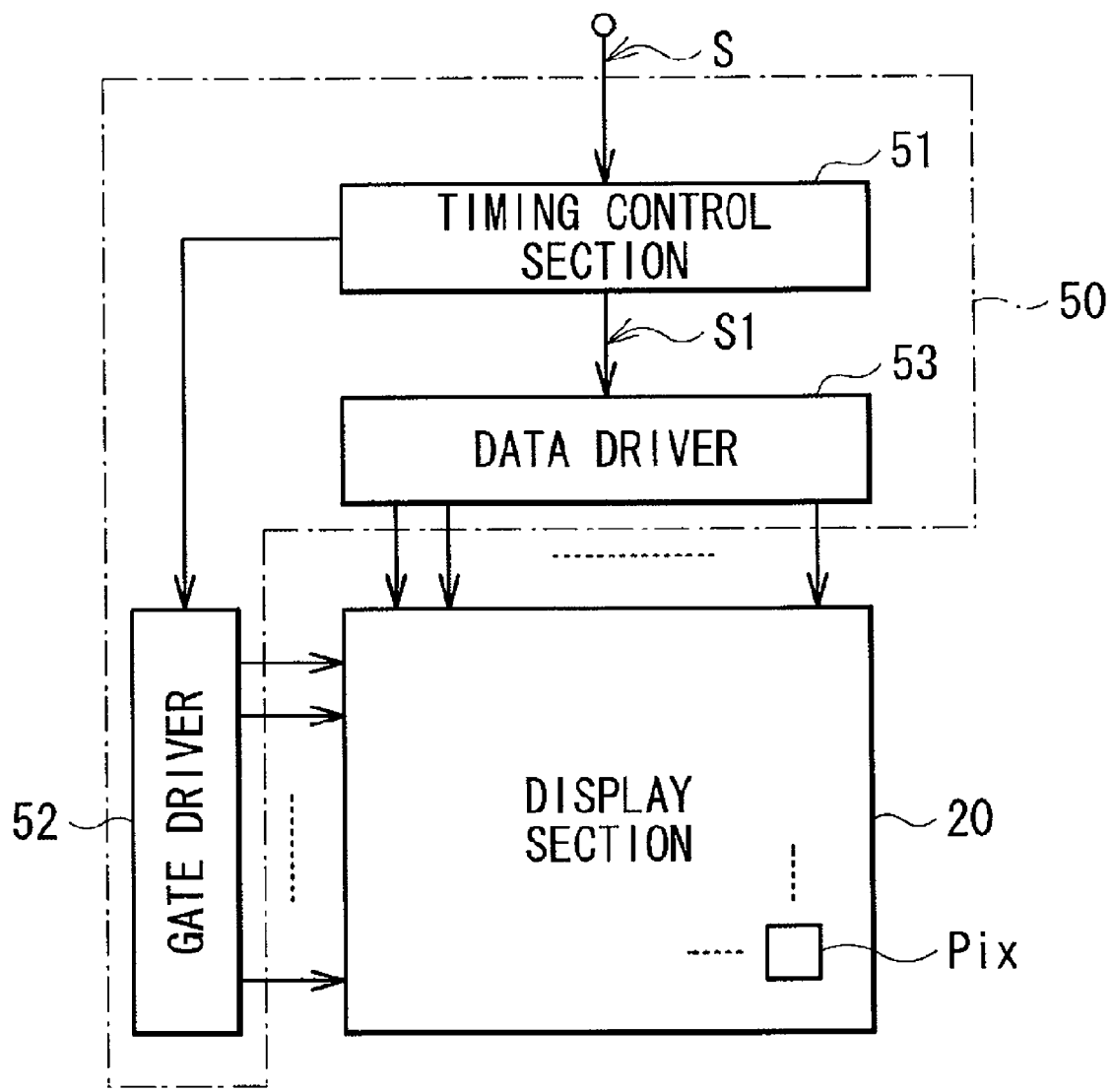
FIG. 3 is a block diagram depicting an example of a configuration of a display driving section shown in FIG. 1.

FIG. 3 is a diagram depicting an example of a block diagram of the display driving section 50. The display driving section 50 includes a timing control section 51, a gate driver 52, and a data driver 53. The timing control section 51 controls drive timings of the gate driver 52 and the data driver 53, and supplies the data driver 53 with the image signal S supplied from the control section 41 as an image signal 51. The gate driver 52 sequentially selects each row of pixels Pix within the display section 20 in accordance with the timing control performed by the timing control section 51, and line-sequentially scans the selected row. The data driver 53 supplies each pixel Pix of the display section 20 with a pixel signal based on the image signal 51. Specifically, the data driver 53 performs a D/A (digital/analog) conversion based on the image signal 51, thereby generating analog pixel signals, and supplies the generated pixel signals to the corresponding pixels Pix.

Figure 4A:
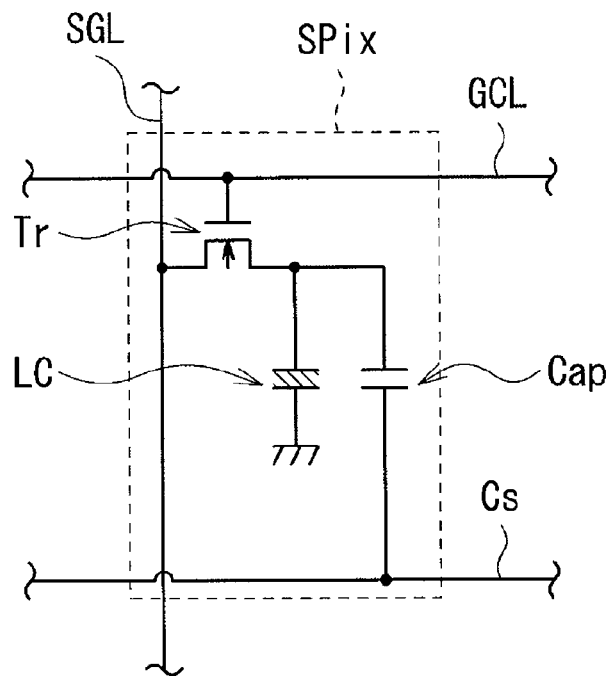
FIGS. 4A and 4B are explanatory diagrams depicting an example of a configuration of a display section shown in FIG. 1.
Figure 4B:
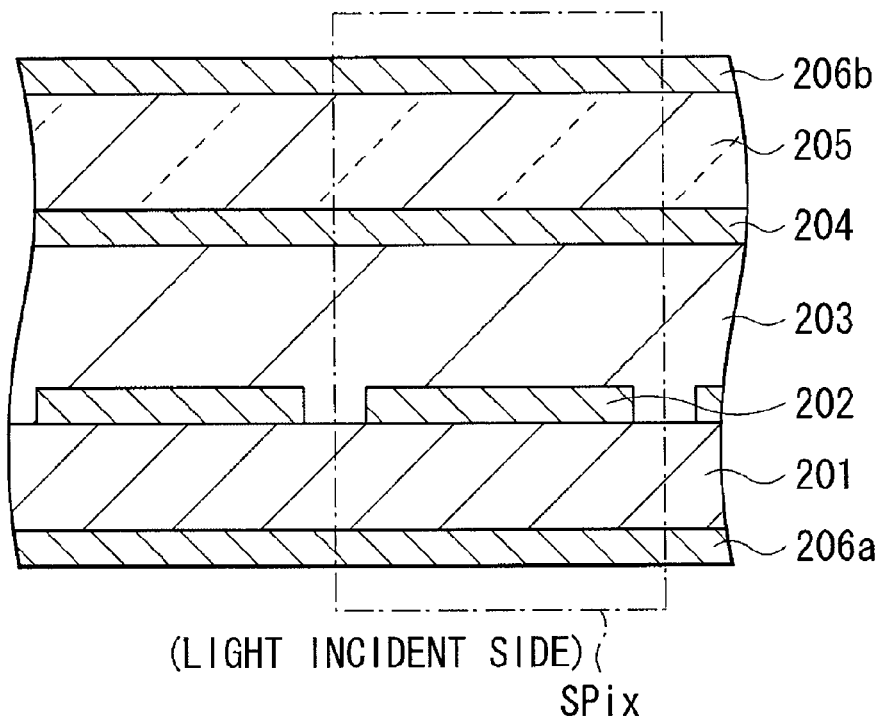

FIGS. 4A and 4B are diagrams depicting an example of a configuration of the display section 20. Specifically, FIG. 4A depicts an example of a circuit diagram of one of sub-pixels SPix constituting the pixel Pix, and FIG. 4B depicts a cross-sectional configuration of the display section 20.

Each pixel Pix has three sub-pixels SPix respectively corresponding to red (R), green (G), and blue (B). Each sub-pixel SPix includes a TFT (thin-film transistor) element Tr, a liquid crystal element LC, and a holding capacitive element Cap, as shown in FIG. 4A. The TFT element Tr may be, for example, a MOS-FET (metal oxide semiconductor-field effect transistor), and has a gate, a source, and a drain connected to a gate line GCL, a data line SGL, and one end of the liquid crystal element LC and one end of the holding capacitive element Cap, respectively. The liquid crystal element LC has one end connected to the drain of the TFT element Tr and the other end grounded. The holding capacitive element Cap has one end connected to the drain of the TFT element Tr, and the other end connected to a holding capacitive line Cs. The gate line GCL is connected to the gate driver 52, and the data line SGL is connected to the data driver 53.

As shown in FIG. 4B, the display section 20 is formed by sealing a liquid crystal layer 203 between a drive substrate 201 and a counter substrate 205. In the drive substrate 201, a pixel drive circuit (not shown) including the above-described TFT element Tr is formed. On this drive substrate 201, a pixel electrode 202 is arranged corresponding to every sub-pixel SPix. In the counter substrate 205, a color filter (not shown) corresponding to red (R), green (G), and blue (B) is formed. In addition, on a surface of the counter substrate 205 which is closer to the liquid crystal layer 203, a counter electrode 204 is disposed as a common electrode for the sub-pixels SPix. A polarization plate 206a is bonded to a surface of the display section 20 where light enters (or which is closer to the backlight 30 in this embodiment), whereas a polarization plate 206b is bonded to the surface of the display section 20 which a light ray outputs (or which is closer to liquid crystal barrier section 10 in this embodiment). These polarization plates 206a and 206b are arranged to be in a cross-Nicole state or a parallel-Nicole state.

(Liquid Crystal Barrier Section 10 and Barrier Driving Section 43)

Figure 5:
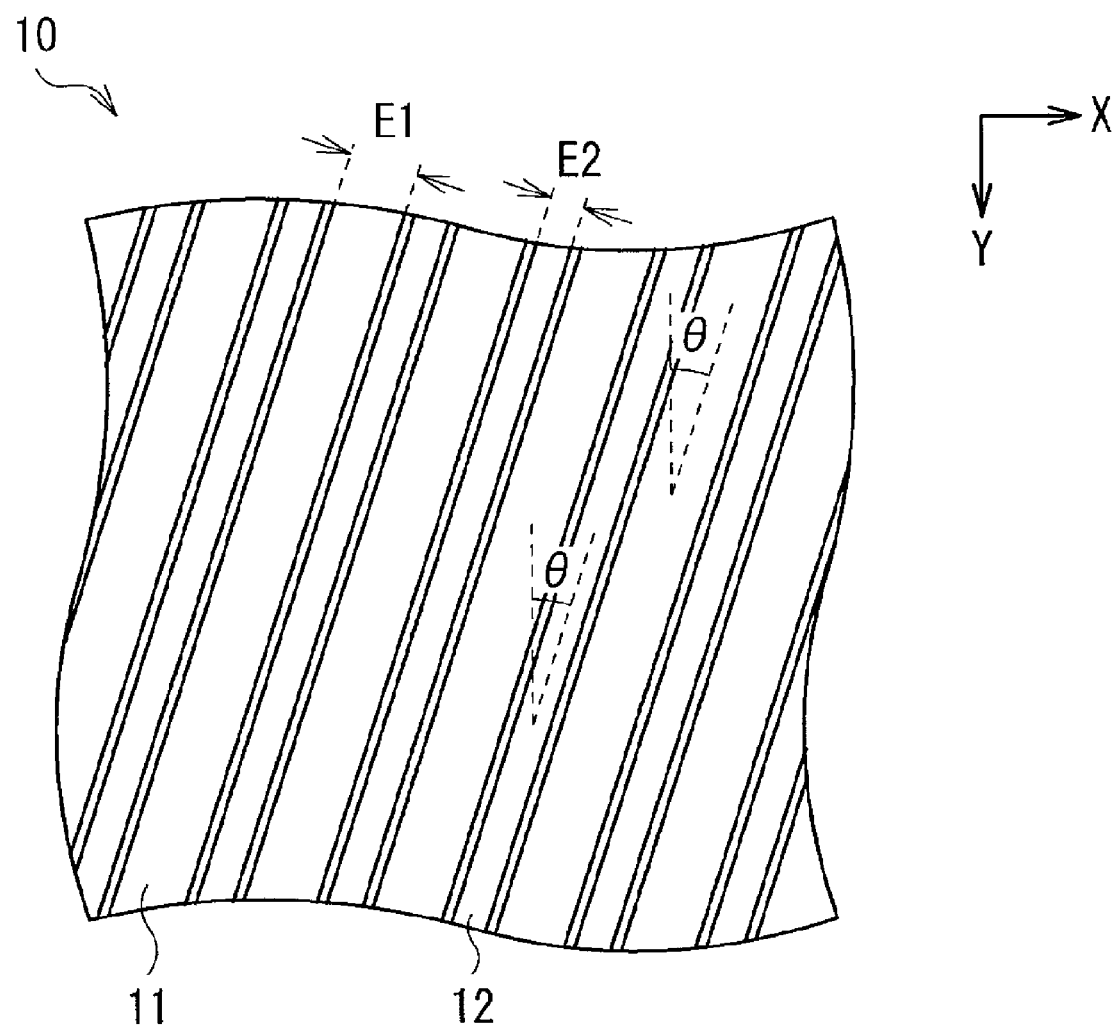
FIG. 5 is an explanatory diagram depicting an example of a configuration of a liquid crystal barrier section shown in FIG. 1.

FIG. 5 depicts an example of a configuration of the liquid crystal barrier section 10. The liquid crystal barrier section 10 is a so-called "parallax barrier", and includes a plurality of opening-closing sections (liquid crystal barriers) 11 and 12 arranged alternately, which allow light to transmit therethrough or to be blocked. These opening-closing sections 11 and 12 operate differently depending on whether the stereoscopic display device 1 performs the normal display (two-dimensional display) or the stereoscopic display. In more detail, each opening-closing section 11 becomes an open state (or a light transmitting state) upon normal display, whereas becoming a closed state (or a light blocking state) upon stereoscopic display, as will be described hereinafter. Each opening-closing section 12 becomes the open state (or a light transmitting state) upon normal display, whereas performing open or close operations in a time-divisional manner upon stereoscopic display, as will be described hereinafter. In this embodiment, the liquid crystal barrier section 10 performs the normally black operation. Thus, the liquid crystal barrier section 10 blocks light when it is not driven.

The opening-closing sections 11 and 12 extend in one direction (for example, in a direction forming a predetermined angle θ with a vertical direction Y in this embodiment) on the X-Y plane. This angle θ may be set to 18 degrees, for example. The opening-closing sections 11 and 12 are formed extending in the oblique direction, as described above, so that more fringes are decreased on the stereoscopic display device 1. The opening-closing sections 11 and 12 have different widths E1 and E2, respectively in this embodiment, and widths E1 and E2 may have a relationship of E1>E2, for example. However, note that the magnitude relationship between the opening-closing sections 11 and 12 is not limited thereto. Alternatively, the relationship may be either E1<E2 or E1=E2. The above opening-closing sections 11 and 12 include a liquid crystal layer (a liquid crystal layer 300 (described hereinafter)), and the open state (light transmitting state) and closed state (light blocking state) thereof are switched in accordance with a drive voltage applied to this liquid crystal layer 300.

Figure 6:
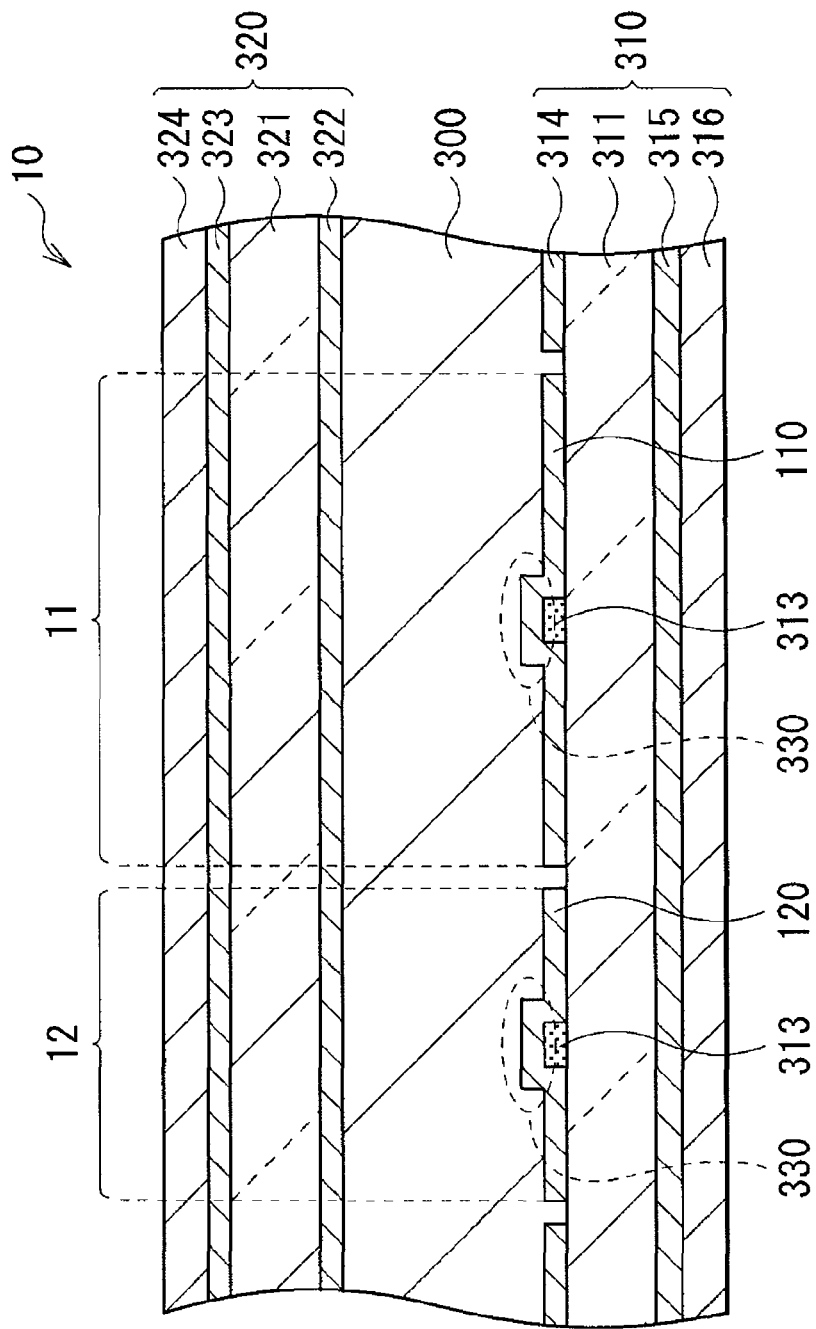
FIG. 6 is a cross-sectional view depicting an example of a configuration of the liquid crystal barrier section shown in FIG. 1.
Figure 7:
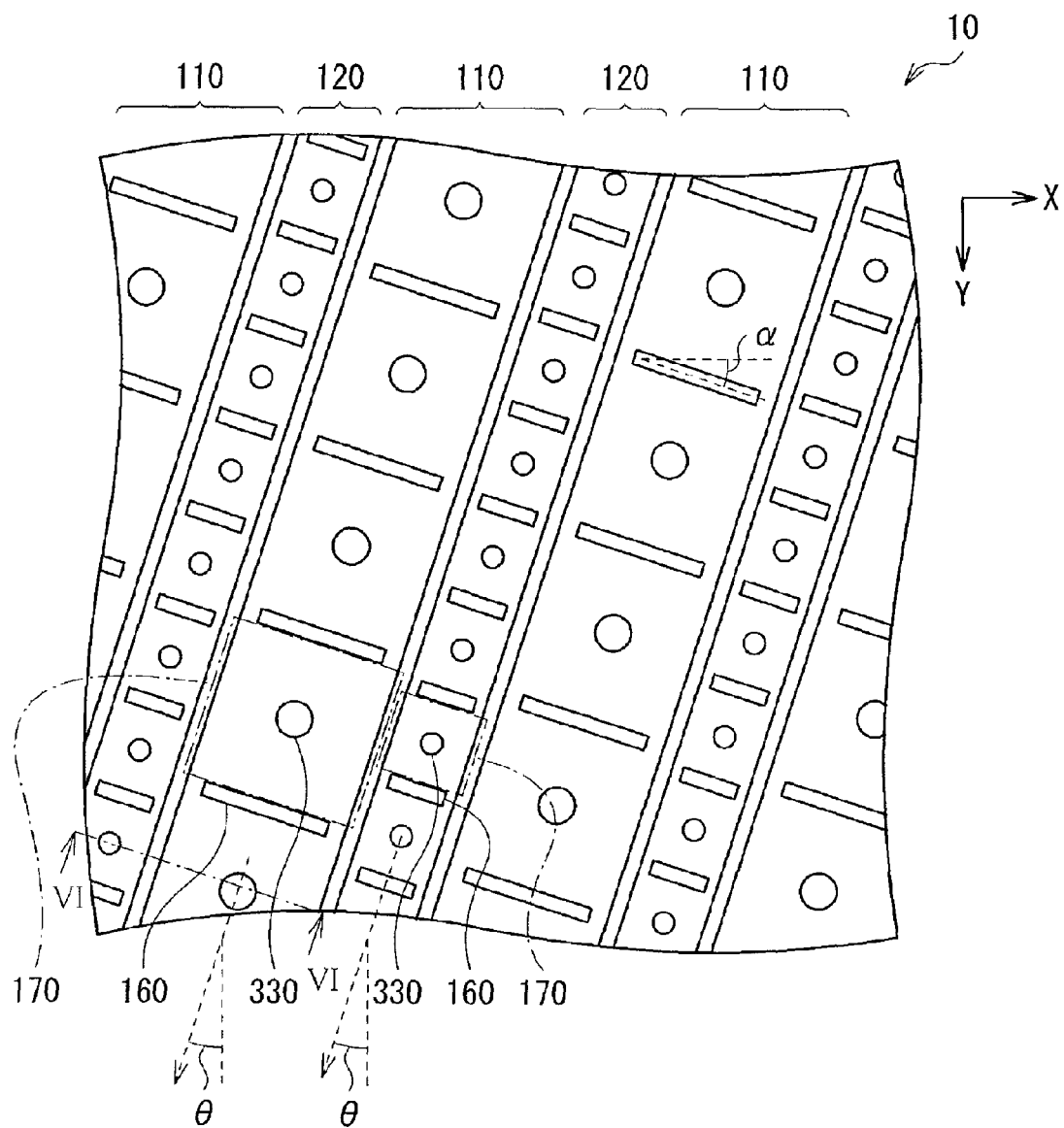
FIG. 7 is a plan view depicting an example of a configuration of a drive substrate shown in FIG. 6.

FIG. 6 depicts a cross-sectional configuration of the liquid crystal barrier section 10. FIG. 7 is an example of a configuration of the liquid crystal barrier section 10. Note that FIG. 6 depicts the cross-sectional configuration of the liquid crystal barrier section 10 taken in the direction of arrows VI-VI shown in FIG. 7.

As shown in FIG. 6, the liquid crystal barrier section 10 includes a drive substrate 310, a counter substrate 320, and a liquid crystal layer 300 disposed between the drive substrate 310 and the counter substrate 320.

The drive substrate 310 includes a transparent substrate 311, an insulating layer 313, a transparent electrode layer 314, a λ/4 plate 315, and a polarizer 316. The transparent substrate 311 may be made of glass, for example. As will be described hereinafter, a signal line layer 312 (described below) is formed on the transparent substrate 311, for example, at a circumferential portion of the liquid crystal barrier section 10. After that the insulating layer 313 made of, for example, SiN is selectively formed, and then, the transparent electrode layer 314 is formed. This transparent electrode layer 314 may be configured of a transparent conductive film made of ITO (indium tin oxide), for example. An oriented film (not shown) is formed on the transparent electrode layer 314. The λ/4 plate 315 and the polarizer 316 are bonded, in this order, to an opposite surface of the transparent substrate 311 from a surface on which the transparent electrode layer 314 and the like are formed.

The counter substrate 320 includes a transparent substrate 321, a transparent electrode layer 322, a λ/4 plate 323, and a polarizer 324. The transparent substrate 321 may be made of, for example, glass, similarly to the transparent substrate 311. The transparent electrode layer 322 is formed on the transparent substrate 321. This transparent electrode layer 322 is a so-called "common electrode" and is formed uniformly on the whole surface of the transparent substrate 321, and may be configured of a transparent conductive film made of, for example, ITO, similarly to the transparent electrode layer 314. A common voltage Vcom of, for example, 0 V is applied to this common electrode. An oriented film (not shown) is formed on the transparent electrode layer 322. A λ/4 plate 323 and a polarizer 324 are bonded, in this order, to an opposite surface of the transparent substrate 321 from a surface on which the transparent electrode layer 322 and the like are formed.

Each of the polarizers 316 and 324 extracts a linear polarization component in the direction of a transmission axis from incident light. The polarizers 316 and 324 are attached to each other to be in the cross-Nicole state. Specifically, for example, the transmission axis of the polarizer 316 is arranged in a horizontal direction X, whereas the transmission axis of the polarizer 324 is arranged in a vertical direction Y. Each of the λ/4 plates 315 and 323 makes a conversion of light between circular and linear polarizations. The λ/4 plates 315 and 323 are arranged such that respective slow axes thereof are shifted from each other by 90 degrees.

The liquid crystal layer 300 has a light transmission rate T that is dependent on the oriented direction. For example, the liquid crystal layer 300 includes liquid crystal molecules having negative dielectric constant anisotropy. These liquid crystal molecules are oriented vertically by the oriented film.

The transparent electrode layer 314 has a plurality of transparent electrodes 110 and 120, on each of which projection portions 330 (described hereinafter) are formed. In addition, the transparent electrode 110 of the transparent electrode layer 314, and portions of the liquid crystal layer 300 and the transparent electrode layer 322 which correspond to the transparent electrode 110 configure the opening-closing section 11. Similarly, the transparent electrode 120 of the transparent electrode layer 314, and portions of the liquid crystal layer 300 and the transparent electrode layer 322 which correspond to this transparent electrode 120 configure the opening-closing section 12. In the liquid crystal barrier section 10 having the above-described configuration, when the common voltage Vcom is applied to the transparent electrode layer 322 and a voltage is selectively applied to the transparent electrode 110 or 120, the liquid crystal layer 300 exhibits a liquid crystal orientation in accordance with the applied voltage. This enables the opening-closing sections 11 and 12 to perform open or close operations individually.

On each of the plurality of transparent electrodes 110 and 120 in the transparent electrode layer 314, as shown in FIG. 7, sub-electrode regions 170 are arranged in a direction same as a direction where the opening-closing sections 11 and 12 extend (in a direction forming a predetermined angle θ with the vertical direction Y). In addition, the projection portion 330 is formed near the center of each sub-electrode region 170. The projection portions 330 have a projecting form which are configured by forming the transparent electrode layer 314 so as to cover the insulating layer 313 (projection patterns) formed near the centers of the corresponding sub-electrode regions 170, as shown in FIG. 6. In each of the transparent electrodes 110 and 120, a slit 160 is formed on each boundary of the sub-electrode regions 170 arranged adjacent to one another in the extending direction of the opening-closing sections 11 and 12, and this slit 160 extend in a direction forming a predetermined angle α with the horizontal direction X. The projection portions 330 formed on the transparent electrodes 110 and 120 allow the liquid crystal molecules in the liquid crystal barrier section 10 to be oriented readily in a desired direction, as will be described hereinafter.

Note that referring to FIG. 7, the angle α is substantially equal to the angle θ between the vertical direction Y and the extending direction of the opening-closing sections 11 and 12. However, the angle α is not limited thereto. Thus, the angle α may be either the same as the angle θ or different therefrom.

In the liquid crystal barrier section 10, the opening-closing sections 12 are classified into a plurality of groups. Upon stereoscopic display, the plurality of opening-closing sections 12 belonging to the same group perform open or close operations at the same timing. Thereinafter, groups of the opening-closing sections 12 will be described.

Figure 8:
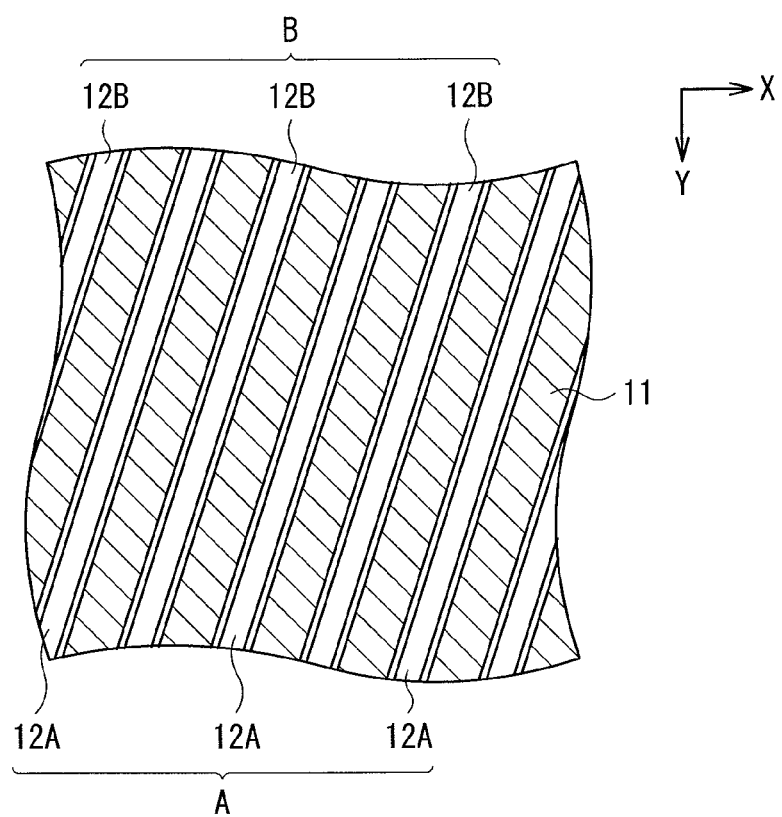
FIG. 8 is an explanatory diagram depicting an example of a group configuration of opening-closing sections shown in FIG. 5.

FIG. 8 depicts an example of a group configuration of the opening-closing sections 12. In this example, the opening-closing sections 12 are classified into two groups. In more detail, the respective opening-closing sections 12 belonging to groups A and B are arranged alternately. Note that, hereinafter, the opening-closing sections 12 belonging to the group A are collectively referred to as "opening-closing sections 12A" as appropriate. Likewise, the opening-closing sections 12 belonging to the group B are collectively referred to as "opening-closing sections 12B" as appropriate.

Figure 9:
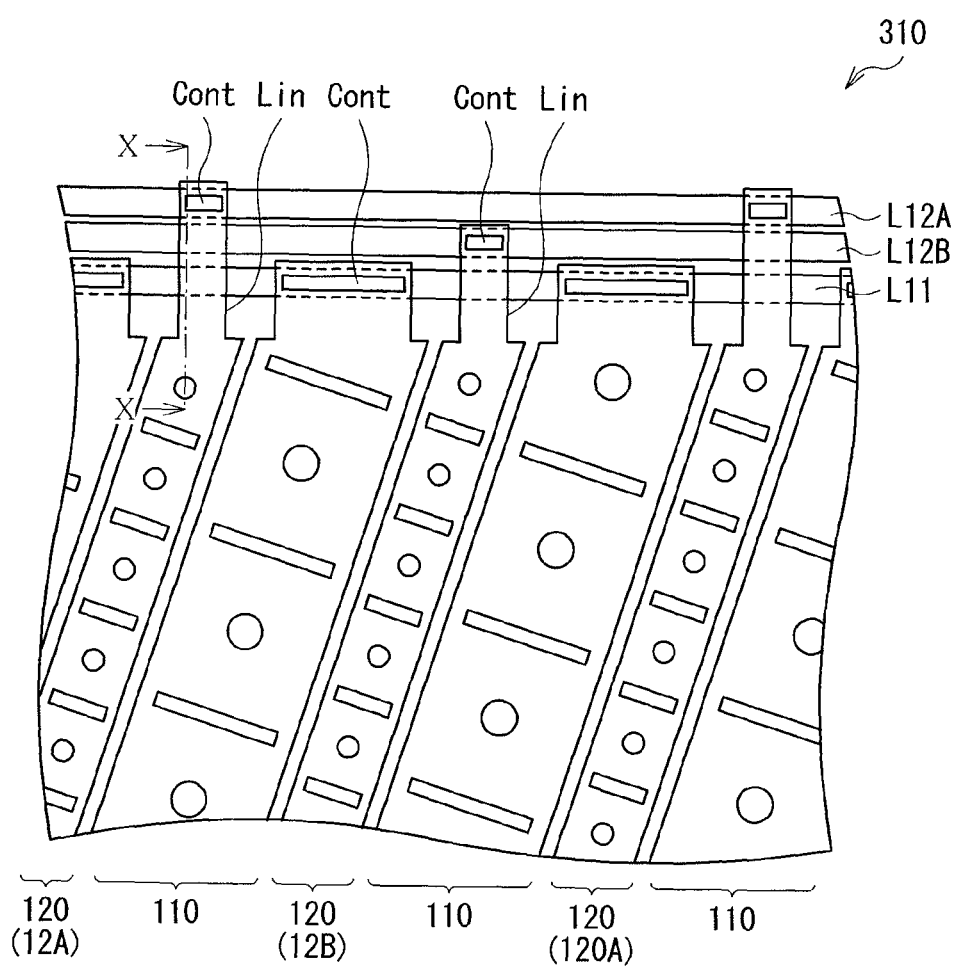
FIG. 9 is a plan view depicting an example of a configuration of signal lines with respect to the opening-closing sections shown in FIG. 5.
Figure 10:
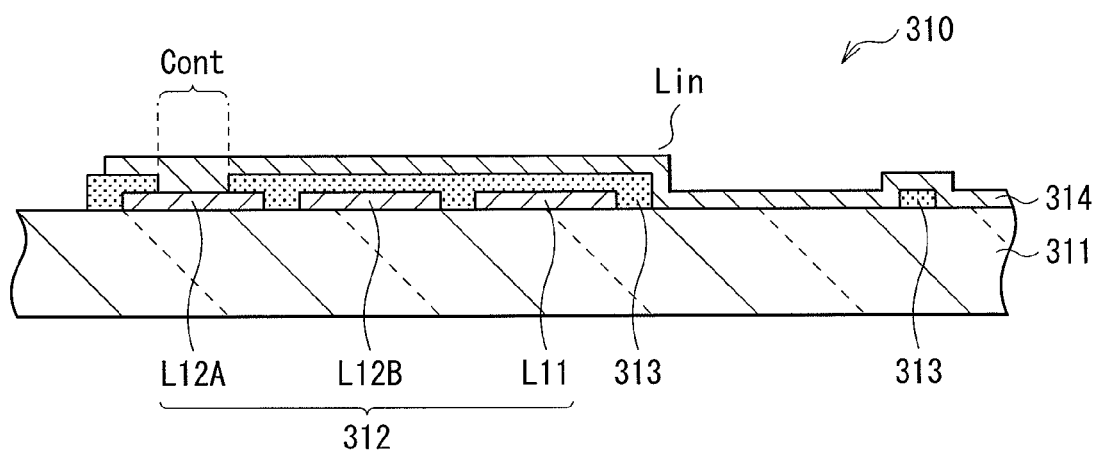
FIG. 10 is a cross-sectional view depicting an example of a configuration of the signal lines shown in FIG. 9.

FIG. 9 depicts a configuration example of signal lines supplying barrier driving signals DRV to the opening-closing sections 11 and 12. FIG. 10 depicts the cross-sectional configuration of the drive substrate 310 taken in a direction of arrows X-X shown in FIG. 9.

In the drive substrate 310, signal lines L11, L12A, and L12B (signal line layer 312) that supply the barrier driving signals DRV to the opening-closing sections 11 and 12 are formed on a circumferential portion surrounding the opening-closing sections 11 and 12. Each of these signal lines L11, L12A, and L12B may be made of metal such as aluminum, molybdenum, and titanium. Then, as shown in FIG. 10, an insulating layer 313 is formed on the signal lines L11, L12A, and L12B. Specifically, this insulating layer 313 are formed in the manufacturing process where the above-described insulating layer 313 (FIG. 6) formed near the centers of the corresponding sub-electrode regions 170 is formed. The signal lines L11, L12A, and L12B are connected to the transparent electrodes 110 of the opening-closing sections 11, the transparent electrodes 120 of the opening-closing sections 12A, and the transparent electrodes 120 of the opening-closing sections 12B, respectively, through contacts Cont and lead-in lines Lin. Specifically, the insulating layer 313 formed above the signal lines L11, L12A, and L12B allows the signal lines L11, L12A, and L12B to intersect the lead-in lines Lin while separating the signal lines L11, L12A, and L12B from the lead-in lines Lin. In addition, in this embodiment, the contacts Cont and the lead-in lines Lin are made of ITO, and are formed integrally with the transparent electrodes 110 and 120. This configuration enables the barrier driving section 43 to supply generated barrier driving signals DRV 11 to the plurality of opening-closing sections 11 through the signal line L11 at the same time, to supply generated barrier driving signals DRV12A to the plurality of opening-closing sections 12A through the signal line L12A at the same time, and to supply generated barrier driving signals DRV12B to the plurality of opening-closing section 12B through the signal line L12B at the same time.

Upon stereoscopic display, the barrier driving section 43 drives the plurality of opening-closing sections 12 such that the opening-closing sections 12 belonging to the same group perform open or close operations at the same timing. In more detail, the barrier driving section 43 drives the plurality of opening-closing sections 12A belonging to the group A and the plurality of opening-closing sections 12B belonging to the group B, so as to perform open or close operations alternately in a time-divisional manner, as described hereinafter.

FIGS. 11A, 11B, and 11C are schematic diagrams depicting the state of the liquid crystal barrier section 10 upon stereoscopic display and normal display (two-dimensional display), by using a cross-sectional configuration. FIG. 11A is a diagram depicting a state of the liquid crystal barrier section 10 upon stereoscopic display, FIG. 11B is a diagram depicting another state of the liquid crystal barrier section 10 upon stereoscopic display, and FIG. 11C is a diagram depicting a state of the liquid crystal barrier section 10 upon normal display. In the liquid crystal barrier section 10, the opening-closing sections 11 and the opening-closing sections 12 (opening-closing sections 12A and 12B) are arranged alternately. In this example, one opening-closing section 12A is provided for six pixels Pix of the display section 20. Likewise, one opening-closing section 12B is provided for six pixels Pix of the display section 20. In FIGS. 11A, 11B, and 11C, ones of the opening-closing sections 11, 12A, and 12B in the liquid crystal barrier section 10 which block light are shown by diagonal lines.

Upon stereoscopic display, the image signals SA and SB are supplied alternately to the display driving section 50. In response to these image signals, the display section 20 performs display. The liquid crystal barrier section 10 allows the opening-closing section 11 to maintain a closed state (light blocking state), and allows the opening-closing sections 12 (opening-closing sections 12A and 12B) to perform open or close operations in a time-divisional manner. In more detail, when the image signal SA is supplied to the display driving section 50, the opening-closing sections 12A become an open state and the opening-closing sections 12B becomes a closed state, respectively, as shown in FIG. 11A. In the display section 20, six pixels Pix, which are arranged adjacent to one another and at a location corresponding to the opening-closing section 12A, display respective six perspective images included in the image signal SA, as described hereinafter. Consequently, for example, when seeing different perspective images with the right and left eyes independently, the viewer recognizes the displayed images as a stereoscopic image, as described hereinafter. Likewise, when the image signal SB is supplied, the opening-closing sections 12B become an open state and the opening-closing sections 12A become a closed states, respectively, as shown in FIG. 11B. In the display section 20, six pixels Pix, which are disposed adjacent to one another and at a location corresponding to the opening-closing section 12B, display respective six perspective images included in the image signal SB, as described hereinafter. Consequently, for example, when seeing different perspective images with right and left eyes independently, the viewer recognizes the displayed images as a stereoscopic image, as described hereinafter. As described above, since the stereoscopic display device 1 displays images while allowing the opening-closing sections 12A and 12B to open alternately, the resolution of the images increases in the display device, as described hereinafter.

Meanwhile, upon normal display (two-dimensional display), the liquid crystal barrier section 10 allows both the opening-closing section 11 and the opening-closing section 12 (opening-closing sections 12A and 12B) to maintain the open state (light transmitting state), as shown in FIG. 11C. This enables the viewer to see a normal two-dimensional image as it is which the display section 20 displays on the basis of the image signal S.

In this embodiment, the liquid crystal barrier section 10 corresponds to a specific example of a "barrier section" of the present disclosure. The opening-closing sections 11 and 12 correspond to a specific example of "liquid crystal barriers" of the present disclosure. The opening-closing sections 12 correspond to a specific example of "liquid crystal barriers in a first group" of the present disclosure, whereas the opening-closing sections 11 correspond to a specific example of "liquid crystal barriers in a second group" of the present disclosure. Each of the transparent electrodes 110 and 120 corresponds to a specific example of a "barrier electrode" according to an embodiment of the present disclosure. The transparent electrodes 110 and 120 in the sub-electrode region 170 correspond to a specific example of a "sub-electrode" of the present disclosure. The electrode in the transparent electrode layer 322 corresponds to a specific example of a "common electrode" of the present disclosure. The $\lambda/4$ plates 315 and 323 correspond to a specific example of "phase plates" of the present disclosure.

(Operation and Effect)

Next, a description will be given below of an operation and effect of the stereoscopic display device 1 according to this embodiment.

(Whole Operation)

First, whole operation of the stereoscopic display device 1 will be described with reference to FIG. 1. The control section 41 supplies the respective control signals to the backlight driving section 42, the display driving section 50, and the barrier driving section 43, on the basis of the image signal Sdisp supplied from an external source. The control section 41 controls the backlight driving section 42, the display driving section 50, and the barrier driving section 43 to operate in synchronization with one another. The backlight driving section 42 drives the backlight 30. The backlight 30 emits surface-emitting light toward the display section 20. The display driving section 50 drives the display section 20 on the basis of the image signal S supplied from the control section 41. The display section 20 performs display by modulating the light emitted from the backlight 30. The barrier driving section 43 drives the liquid crystal barrier section 10 on the basis of the barrier driving signal DRV. The opening-closing sections 11 and 12 (12A and 12B) in the liquid crystal barrier section 10 perform open or close operations on the basis of the barrier driving signal DRV. As a result, light which has been emitted from the backlight 30 and transmitted through the display section 20 is allowed to pass through the liquid crystal barrier section 10 or is blocked.

(Detailed Operation)

FIGS. 12A and 12B are diagrams depicting an example of an operation of the display section 20 and the liquid crystal barrier section 10 upon stereoscopic display. Specifically, FIG. 12A is a diagram depicting the operation when an image signal SA is supplied, and FIG. 12B is a diagram depicting the operation when an image signal SB is supplied.

As shown in FIG. 12A, when the image signal SA is supplied, respective pixels Pix of the display section 20 display pieces of pixel information P1 to P6 that correspond to six perspective images included in the image signal SA. In this case, the pieces of pixel information P1 to P6 are displayed at respective pixels Pix that are located in the vicinity of the opening-closing sections 12A. When the image signal SA is supplied, in the liquid crystal barrier section 10, the opening-closing sections 12A are controlled to become an open state (light transmitting state) and the opening-closing sections 12B are controlled to become a closed state. Each opening-closing section 12A specifies the individual angles of the light rays output from the pixels Pix of the display section 20. For example, when seeing the pixel information P3 with the left eye and the pixel information P4 with the right eye, the viewer recognizes a stereoscopic image.

Meanwhile, as shown in FIG. 12B, when the image signal SB is supplied, respective pixels Pix of the display section 20 display pieces of pixel information P1 to P6 that correspond to six perspective images included in the image signal SB. In this case, the pieces of pixel information P1 to P6 are displayed at respective pixels Pix that are located in the vicinity of the opening-closing sections 12B. When the image signal SB is supplied, in the liquid crystal barrier section 10, the opening-closing sections 12B are controlled to become an open state (light transmitting state) and the opening-closing sections 12A are controlled to become the closed state. Each opening-closing section 12B specifies the individual angles of the light output from the pixels Pix of the display section 20. For example, when seeing the pixel information P3 with the left eye and the pixel information P4 with the right eye, the viewer recognizes a stereoscopic image.

In this way, when seeing one of the pieces of pixel information P1 to P6 with the right eye and another one thereof with the left eye, the viewer perceives a stereoscopic image. In addition, since the opening-closing sections 12A and 12B are opened alternately in a time-divisional manner to allow an image to be displayed, the viewer sees an average of images displayed at locations shifted from each other. Therefore, the stereoscopic display device 1 achieves the displaying of an image having twice the resolution of an image which a display device provided with only the opening-closing sections 12A displays. In other words, the resolution of an image that the stereoscopic display device 1 displays may decreased only to one-third (=⅙×2) of an image in two-dimensional display.

In the stereoscopic display device 1, each of the transparent electrodes 110 and 120 of the liquid crystal barrier section 10 is provided with the projection portion 330. Therefore, the liquid crystal molecules are allowed to be oriented readily in a desired direction. Thereinafter, the detail of this will be described.

Figure 13A:
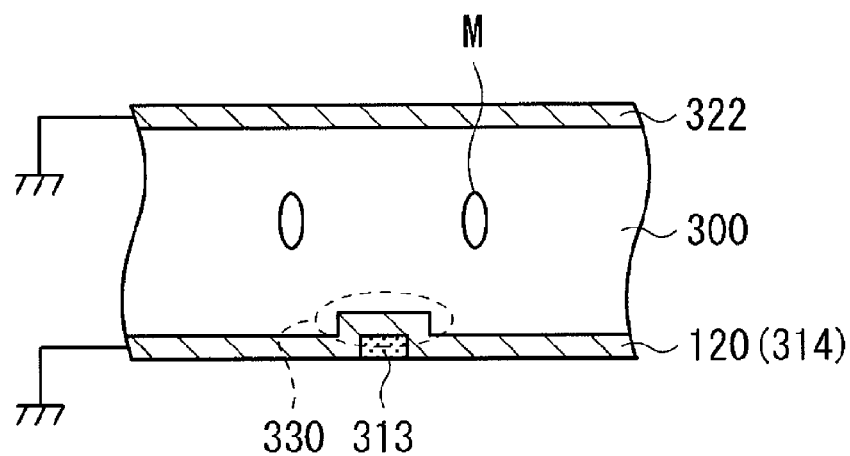
FIGS. 13A and 13B are schematic diagrams depicting a behavior of liquid crystal molecules in the liquid crystal barrier section shown in FIG. 1.
Figure 13B:
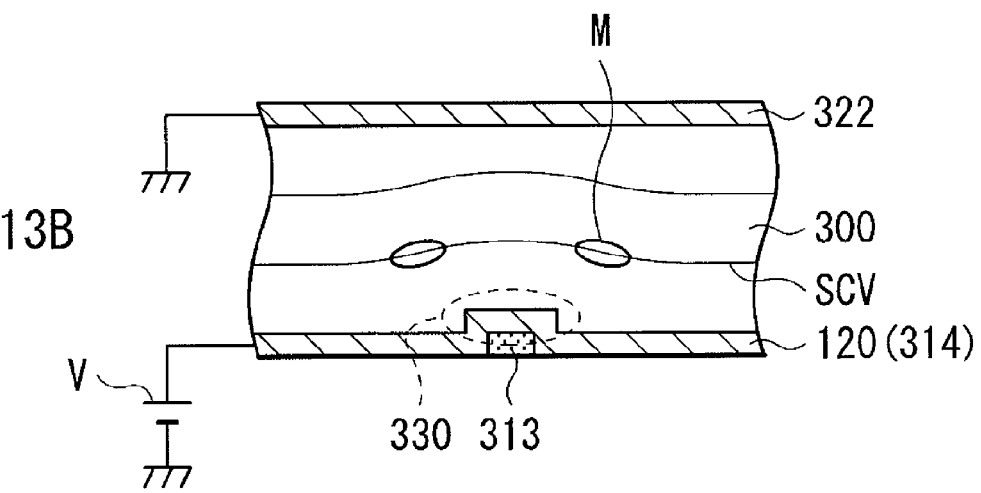

FIGS. 13A and 13B schematically depict behaviors of the liquid crystal molecules in the opening-closing section 12. Specifically, FIG. 13A depicts the behavior of the liquid crystal molecules when the opening-closing section 12 is in the closed state (light blocking state), and FIG. 13B depicts the behavior of the liquid crystal molecules when the opening-closing section 12 is in the open state (light transmitting state). In FIGS. 13A and 13B, the case in which the liquid crystal molecules having negative dielectric constant anisotropy are oriented vertically is illustrated. In this example, the description will be given as to the opening-closing section 12, but note that the same applies to the opening-closing section 11.

When a voltage of 0 V is applied to the transparent electrode 120, the potential difference between the voltages applied to the transparent electrode 120 and the common electrode (transparent electrode layer 322) is 0 V. Accordingly, as shown in FIG. 13A, the long axis of each liquid crystal molecule M in the liquid crystal layer 300 is oriented in a direction perpendicular to the substrate surface. In this case, the light transmission rate T of the liquid crystal layer 300 decreases, and the opening-closing section 12 becomes the closed state (light blocking state).

Meanwhile, when a voltage V is applied to the transparent electrode 120, an equipotential surface SCV are generated based on the potential difference between the voltages applied to the transparent electrode 120 and the common electrode (transparent electrode layer 322), as shown in FIG. 13B. In this case, the long axis of each liquid crystal molecule M is oriented in a direction along the equipotential surface SCV. In the liquid crystal layer 300, when a voltage applied to the transparent electrode 120 is changed from 0 V (FIG. 13A) to V (FIG. 13B), the liquid crystal molecules M fall down and are oriented as shown in FIG. 13B. In this case, due to the projection portion 330 formed on the transparent electrode 120, the equipotential surface SCV is not parallel to the substrate surface, but are curved at a portion corresponding to the projection portion 330. In other words, an electric field generated in the liquid crystal layer 300 has a component in a direction parallel to the substrate surface at the portion corresponding to the projection portion 330. This allows the liquid crystal molecules M to fall down and to be oriented readily, as shown in FIG. 13B, in accordance with a voltage applied to the transparent electrode 120.

(Manufacturing Processes of Liquid Crystal Barrier Section 10)

Next, a description will be given of a manufacturing process of the liquid crystal barrier section 10.

Figure 14:
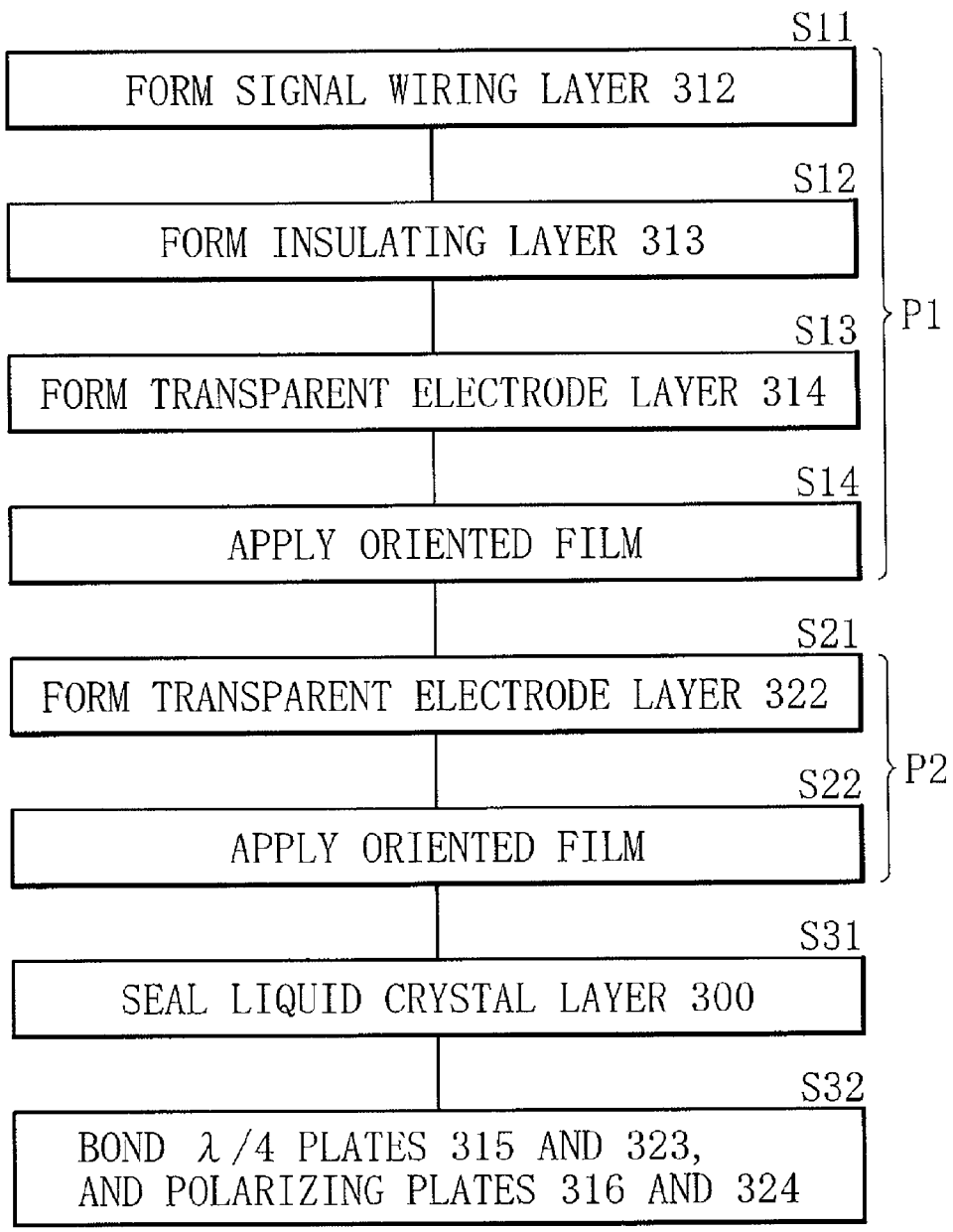
FIG. 14 is a flowchart depicting manufacturing processes of the liquid crystal barrier section shown in FIG. 1.

FIG. 14 is a flowchart showing manufacturing processes of the liquid crystal barrier section 10. In the manufacturing processes of the liquid crystal barrier section 10, first, the drive substrate 310 and the counter substrate 320 are formed, and then, the liquid crystal layer 300 is sealed between the drive substrate 310 and the counter substrate 320. Thereinafter, the detail of this will be described.

First, a manufacturing process P1 of the drive substrate 310 is performed. Specifically, the signal line layer 312 is formed on a surface of the transparent substrate 311, for example, by a deposition method or a sputtering method. Subsequently, the resultant is patterned by a photolithography or a dry etching method, so that the signal lines L11, L12A, and L12B are formed (Step S11). Then, the insulating layer 311 is formed, for example, by a plasma CDV method, so that the insulating layer 313 having a desired thickness is formed. Subsequently, the insulating layer 313 is patterned by a photolithography method, so that patterns fare formed on the signal lines L11, L12A, and L12B, the vicinity of the centers of regions corresponding to the sub-electrode regions 170 (portions corresponding to the projection portions 330), and the like (Step S12). Then, the transparent electrode layer 314 is formed, for example, by a deposition method or a sputtering method. Subsequently, the transparent electrode layer 314 is patterned by a photolithography method so that the lead-in lines Lin and the transparent electrodes 110 and 120 are formed (Step S13). In this case, contact holes are formed in the insulating layers 313, and the signal lines L11, L12A, and L12B are electrically connected to the lead-in lines Lin respectively through the contact holes. Following this, a vertical orientation agent is applied to cover a surface on which the transparent electrode layers 314 are formed, for example, by a spin coat method. Subsequently, the resultant is baked, so that the oriented film is formed (Step S14).

Next, a manufacturing process P2 of the counter substrate 320 is performed. Specifically, the transparent electrode layer 322 is formed uniformly on a surface of the transparent substrate 321, for example, by a deposition method or a sputtering method (Step S21). Following this, a vertical orientation agent is applied to a surface of the transparent electrode layer 322, for example, by a spin coat method, and is baked. Consequently, the oriented film is formed (Step S22).

Next, the liquid crystal layer 300 is formed and sealed (Step S31). Specifically, first, a seal section having, for example, an ultraviolet curable property or thermosetting property is printed on an edge region of the substrate manufactured at Steps S11 to S14. Subsequently, liquid crystal is dropped and filled in a region surrounded by the seal section, so that the liquid crystal layer 300 is formed. After that, the substrate manufactured at Steps S21 and S22 is overlaid on this substrate with a spacer made of, for example, photosensitive acryl resin in between, and the seal section is cured. In this way, the liquid crystal layer 300 is sealed.

Finally, the polarizers 316 and 324 are bonded to each other (Step S32). Specifically, the λ/4 plate 315 and the polarizer 316 are bonded, in this order, to an opposite surface of the transparent substrate 311 from a surface which seals the liquid crystal layer 300. Furthermore, the λ/4 plate 323 and the polarizer 324 are bonded, in this order, to an opposite surface of the transparent substrate 321 from a surface which seals the liquid crystal layer 300.

Thus, the liquid crystal barrier section 10 is manufactured.

As described above, when the liquid crystal barrier section 10 is manufactured, the insulating layer 313 to allow the signal lines L11, L12A, and L12B to intersect the lead-in lines Lin, and the insulating layer 313 that are disposed near the center of the sub-electrode region 170 are formed at the same time. This achieves the simple manufacturing processes.

Comparative Example

Next, a description will be given of a function of this embodiment by comparing with a stereoscopic display device 1R according to a comparative example. A liquid crystal barrier section 10R in the stereoscopic display device 1R of the comparative example is provided with holes formed in the common electrode (transparent electrode layer 322), instead of the projection portions 330 formed in the transparent electrode layer 314. Other configurations of the stereoscopic display device 1R are the same as those of the embodiment (see FIG. 1).

Figure 15:
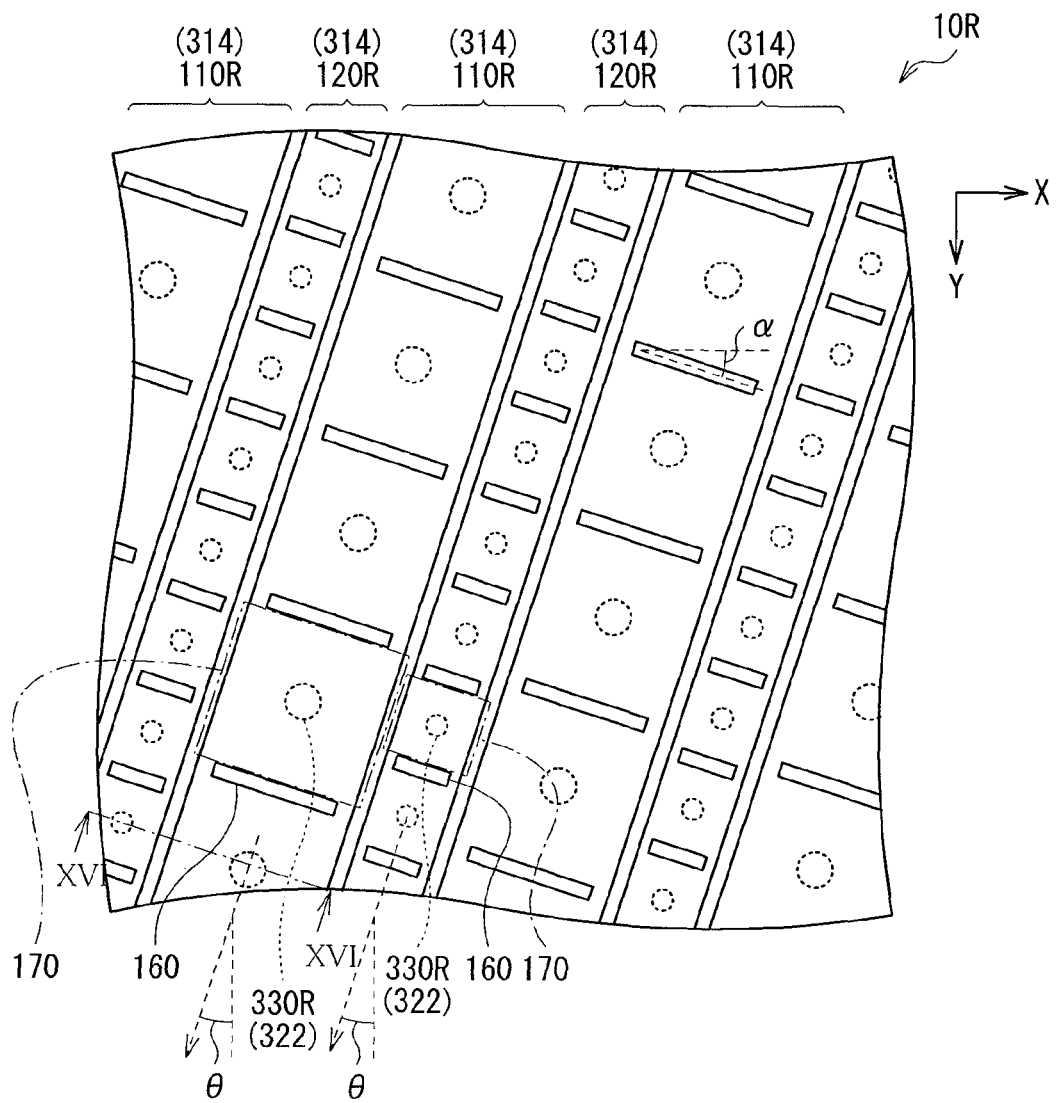
FIG. 15 is a plan view depicting an example of a configuration of a liquid crystal barrier section according to a comparative example.
Figure 16:
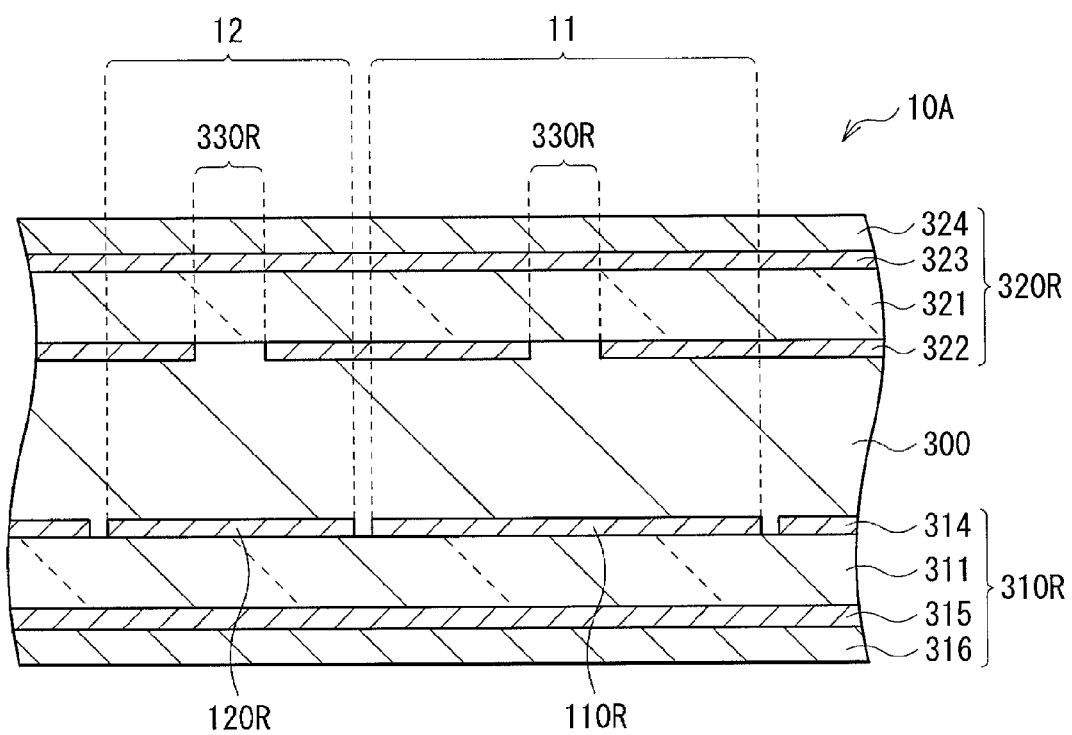
FIG. 16 is a cross-sectional view depicting an example of a configuration of the liquid crystal barrier section according to the comparative example.

FIG. 15 depicts an example of a configuration of the transparent electrode layers 314 and 322 in the liquid crystal barrier section 10R of the comparative example. FIG. 16 depicts a cross-sectional structure of the liquid crystal barrier section 10R, taken in a direction of arrows XVI-XVI shown in FIG. 15.

As shown in FIG. 15, the transparent electrode layer 314 includes transparent electrodes 110R and 120R. On each of the transparent electrodes 110R and 120R, the sub-electrode regions 170 are arranged in the extending direction of the opening-closing sections 11 and 12, similarly to the liquid crystal barrier section 10 according to the embodiment. In addition, as shown in FIGS. 15 and 16, the transparent electrode layer 322 has holes 330R at locations corresponding to the vicinity of the centers of the sub-electrode regions 170. Specifically, the liquid crystal barrier section 10 of the embodiment has the projection portions 330 provided in the transparent electrode layer 314 (see FIGS. 6 and 7), whereas the liquid crystal barrier section 10R of the comparative example has the holes 330R in the transparent electrode layer 322 instead of the projection portions 330 (FIGS. 15 and 16).

Figure 17A:
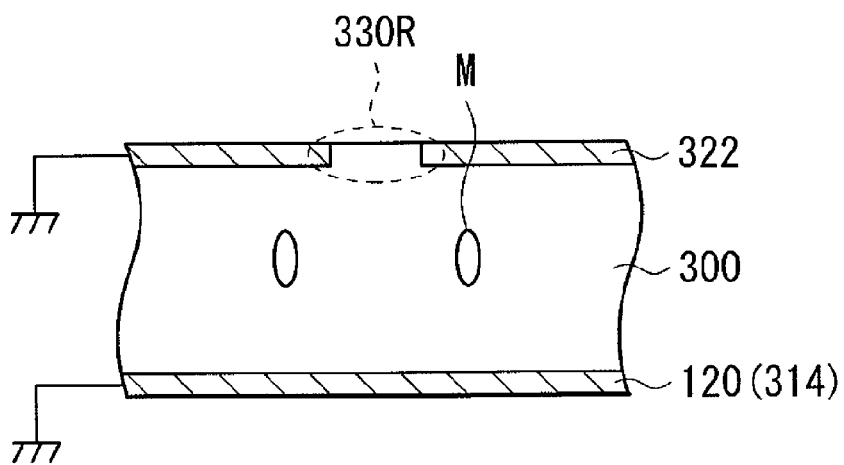
FIGS. 17A and 17B are schematic diagrams depicting a behavior of liquid crystal molecules in the liquid crystal barrier section according to the comparative example.
Figure 17B:
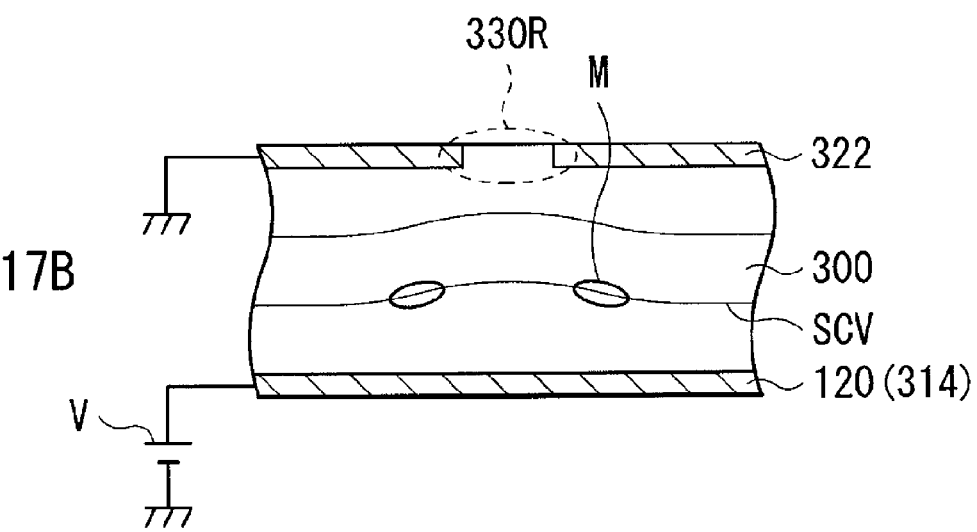

FIGS. 17A and 17B schematically depict behaviors of the liquid crystal molecules in the liquid crystal barrier section 10R. Specifically, FIG. 17A depicts the behavior of the liquid crystal molecules when the opening-closing section 12 is in the closed state (light blocking state), and FIG. 17B depicts the behavior of the liquid crystal molecules when the opening-closing section 12 is in the open state (light transmitting state). When a voltage V is applied to the transparent electrode 120, in the liquid crystal barrier section 10R of the comparative example, equipotential surfaces SCV are slightly curved in the region corresponding to the hole 330R, as shown in FIG. 17B, similarly to the case of the liquid crystal barrier section 10 of the embodiment. Accordingly, when a voltage applied to the transparent electrode 120 is changed from 0 V (see FIG. 17A) to the voltage V (see FIG. 17B), the liquid crystal molecules M fall down and are oriented readily, as shown in FIG. 17B. In other word, the holes 330R according to the comparative example have a similar effect to that of the projection portions 330 according to this embodiment.

Figure 18:
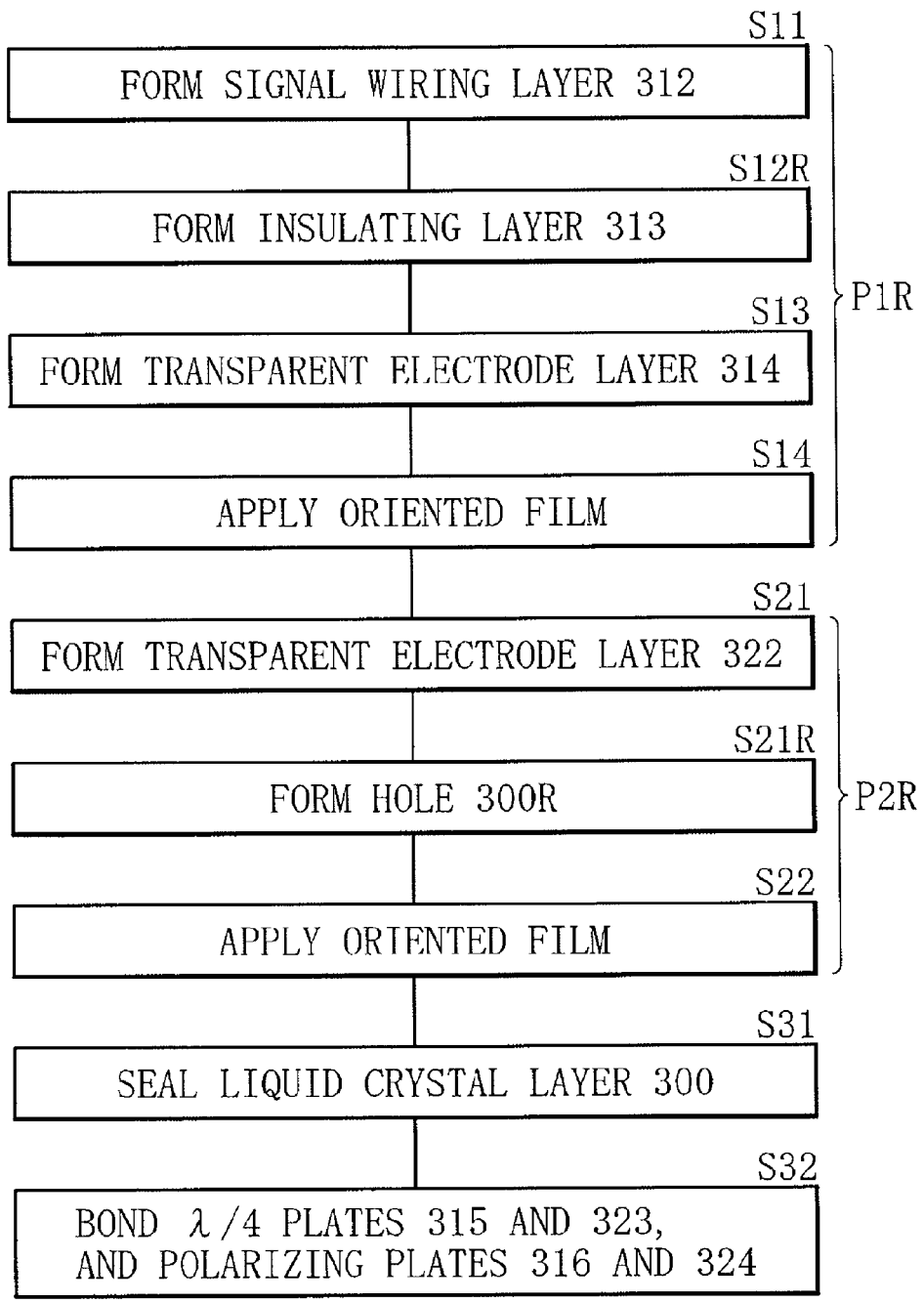
FIG. 18 is a flowchart depicting manufacturing processes of the liquid crystal barrier section according to the comparative example.

FIG. 18 is a flowchart of manufacturing processes of the liquid crystal barrier section 10R. The manufacturing processes of the liquid crystal barrier section 10R differs from that of the embodiment (see FIG. 14) in including a forming step of the insulating layer 313 (Step S12R) instead of the forming step of the insulating layer 313 (Step S12), and additionally including a forming step of the holes 330R (Step S21R) performed after the forming step of the transparent electrode layer 322 (Step S21).

At the forming step of the insulating layer 313 (Step S12R), the insulating layer 313 is formed to have a desired thickness, for example, by a plasma CVD method. Subsequently, the resultant is patterned by a photolithography method, so that patterns are formed on the signal lines L11, L12A, L12B, and the like. In other words, the patterns are formed near the center of the region corresponding to the sub-electrode region 170 at Step S12 in the embodiment, whereas no patterns are formed there at Step S12R in the comparative example.

Further, at the forming step of the holes 330R (Step S21R), the transparent electrode layer 322 which has been uniformly formed at the previous step (Step S21) is patterned by a photolithography method, and the holes 330R are formed.

As described above, in the liquid crystal barrier section 10R according to the comparative example, the holes 330R are formed, at the dedicated manufacturing process (Step S21R). Meanwhile, in the liquid crystal barrier section 10 according to this embodiment, the projection portions 330 which have a similar effect to that of the holes 330R are formed utilizing the forming step of the insulating layers 313 (Step S12) to allow the signal lines L11, L12A, and L12B to intersect the lead-in lines Lin. Thus, the stereoscopic display device 1 according to the embodiment achieves the simpler manufacturing processes.

(Effect)

As described above, in this embodiment, the projection portions are provided to allow the liquid crystal molecules to be oriented readily.

Further, in this embodiment, the projection portions are formed utilizing the manufacturing process, which is originally provided, of the insulating layer to allow the signal lines and the lead-in lines Lin to intersect each other. Accordingly, the simple manufacturing processes are achieved.

Hereinbefore, the present disclosure has been described with referring to the embodiments. However, the present disclosure is not limited to the above-described embodiments, and various modifications may be made.

Figure 19A:
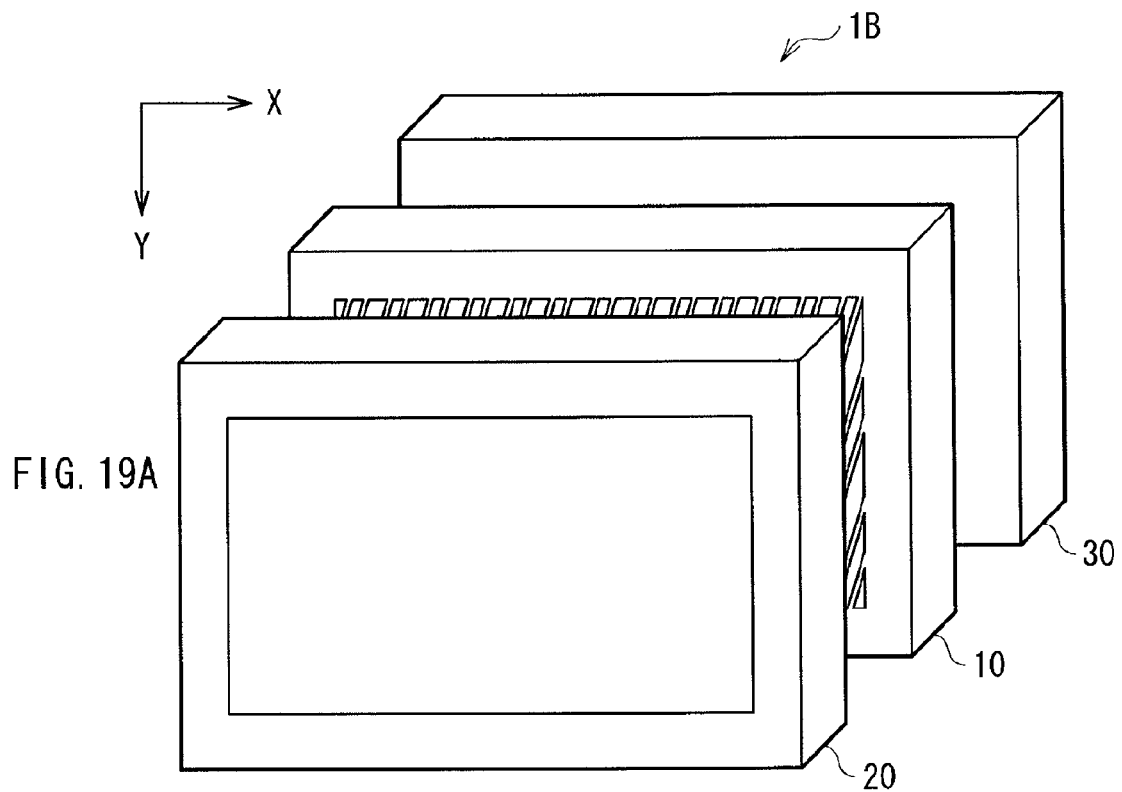
FIGS. 19A and 19B are explanatory diagrams depicting an example of a configuration of a stereoscopic display device according to a modification.
Figure 19B:
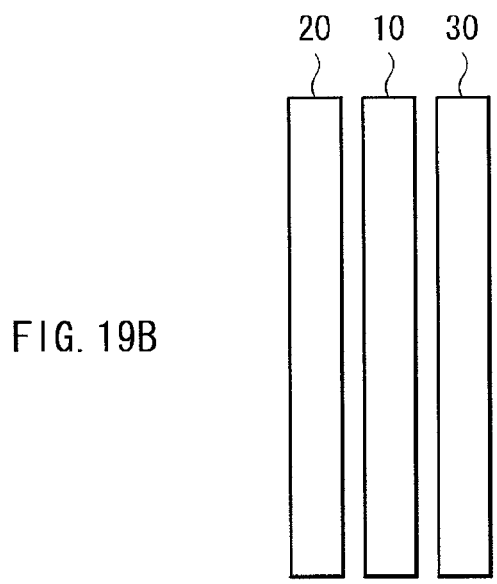

For example, although the backlight 30, the display section 20, and the liquid crystal barrier section 10 are arranged in this order in the stereoscopic display device 1 of the embodiment, the arrangement of the backlight 30, the display section 20, and the liquid crystal barrier section 10 is not limited thereto. Alternatively, the backlight 30, the liquid crystal barrier section 10, and the display section 20 may be arranged in this order, as shown in FIGS. 19A and 19B.

FIGS. 20A and 20B are diagrams each depicting an example of an operation of the display section 20 and the liquid crystal barrier section 10 according to a modification of the embodiment. Specifically, FIG. 20A is a diagram depicting the operation when an image signal SA is supplied, and FIG. 20B is a diagram depicting the operation when an image signal SB is supplied. In this modification, first, the backlight 30 emits light, and this light enters the liquid crystal barrier section 10. Then, the opening-closing sections 12A and 12B allow parts of the light to pass therethrough. Finally, the display section 20 modifies the parts of the light and, outputs six perspective images.

In the embodiment and the like, the opening-closing sections 12 constitute, for example, two groups, but the number of groups is not limited to two. Alternatively, for example, the opening-closing sections 12 may constitute three or more groups, in order to further increase the resolution of the display. The detail description of this is as follows.

FIGS. 21A, 21B, and 21C depict an example of an operation of the opening-closing sections 12, when the opening-closing sections 12 constitute three groups A, B, and C. Similarly to the embodiment, opening-closing sections 12A, 12B, and 12C correspond to those belonging to groups A, B, and C, respectively.

As the example shown in FIGS. 21A, 21B, and 21C, the stereoscopic display device of this modification displays images while allowing the opening-closing sections 12A, 12B, and 12C to open sequentially in a time-divisional manner. This enables the stereoscopic display device of this modification to achieve the displaying of an image having three times the resolution of an image which a display device provided with the opening-closing sections 12A alone displays. In other words, the resolution of an image that this stereoscopic display device displays may be decreased only to one-half (=⅙×3) of that of an image in the case of two-dimensional display.

Figure 22:
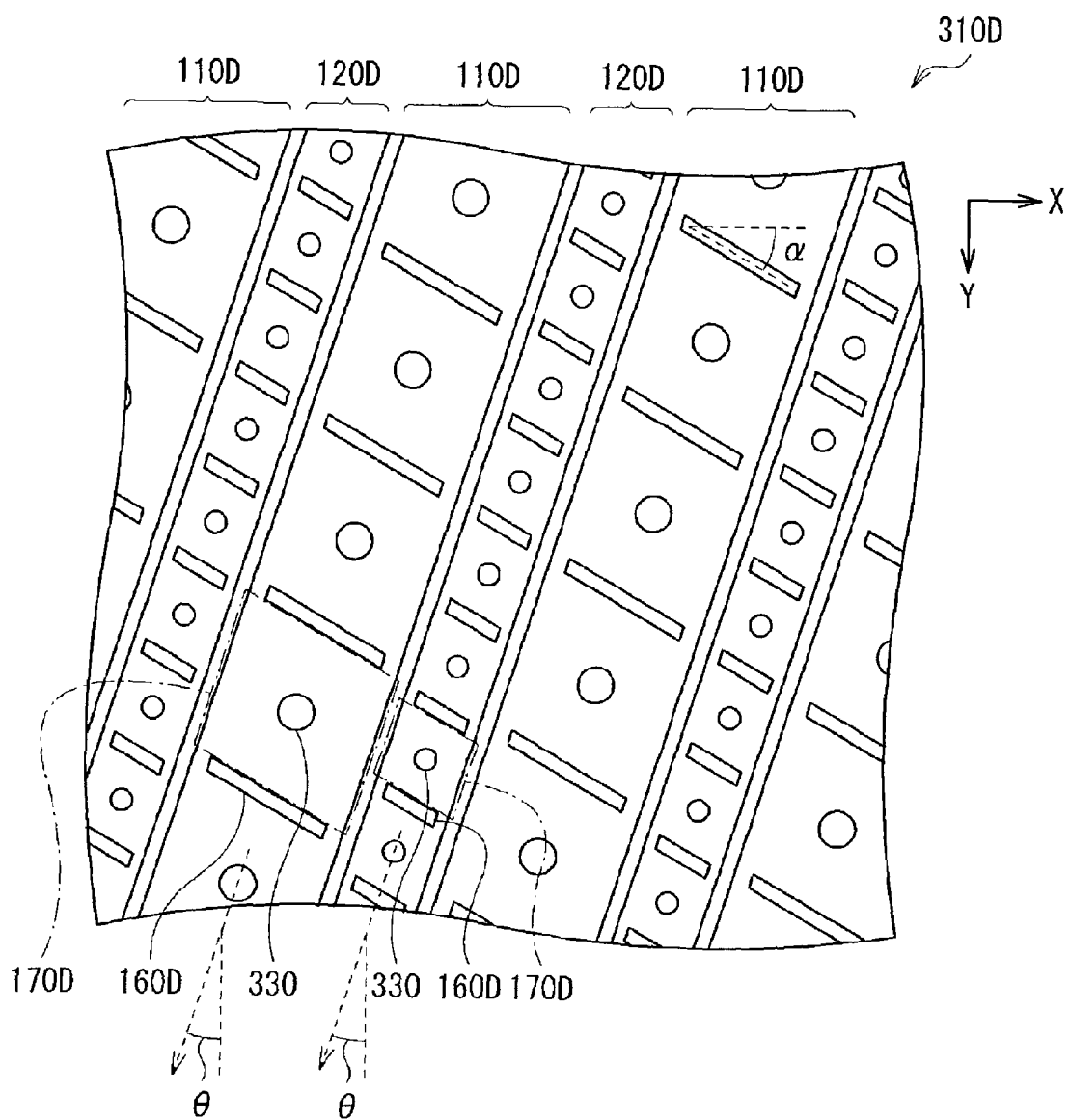
FIG. 22 is a plan view depicting an example of a configuration of a drive substrate according to still another modification.

Although the angle α is, for example, substantially equal to the angle θ in this embodiment, the relationship of both angles is not limited thereto. Alternatively, for example, the angles α and θ may differ from each other, as shown in FIG. 22.

Figure 23:
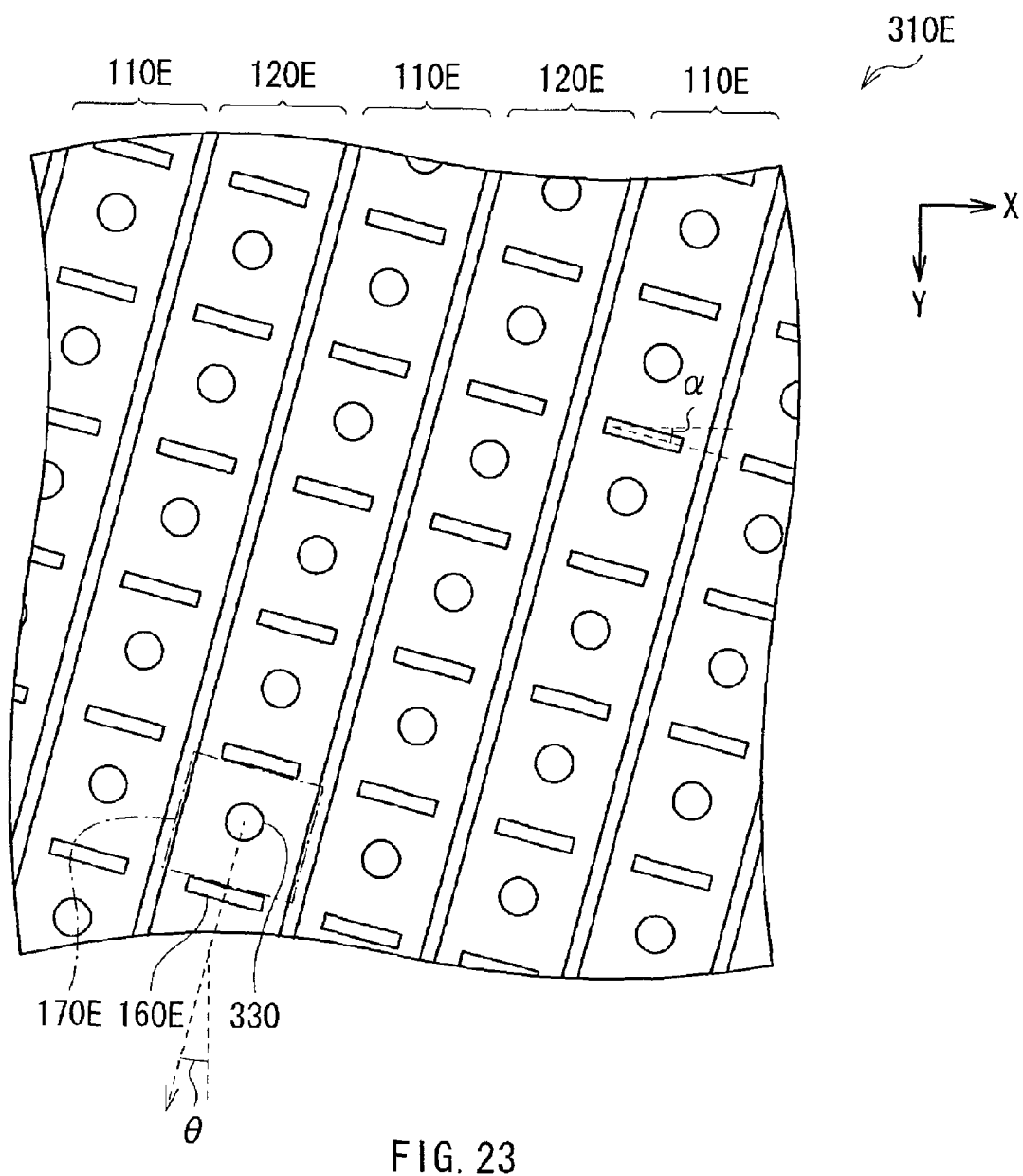
FIG. 23 is a plan view depicting an example of a configuration of a drive substrate according to still another modification.

This embodiment gives an example in which the width E1 of each opening-closing section 11 is greater than the width E2 of each opening-closing section 12 (E1>E2). However, the relationship of both widths is not limited thereto. Alternatively, for example, the width E1 of each opening-closing section 11 may be equal to the width E2 of each opening-closing section 12 (E1=E2), or the width E1 of each opening-closing section 11 may be smaller than the width E2 of each opening-closing section 12 (E1<E2). FIG. 23 depicts an example in which the width E1 of each opening-closing section 11 is equal to the width E2 of each opening-closing section 12 (E1=E2).

Figure 24A:
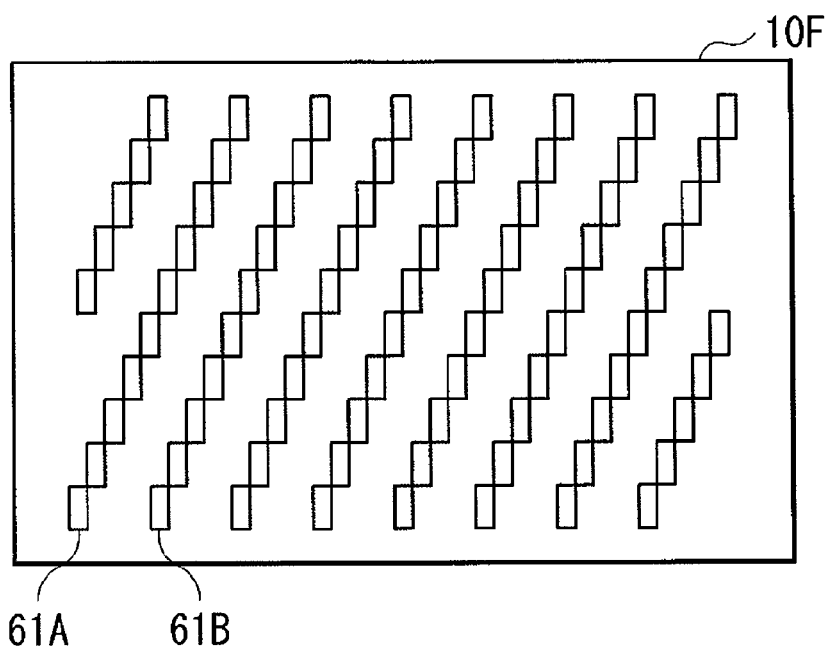
FIGS. 24A and 24B are explanatory diagrams depicting an example of a configuration of a liquid crystal barrier section according to other modifications.
Figure 24B:
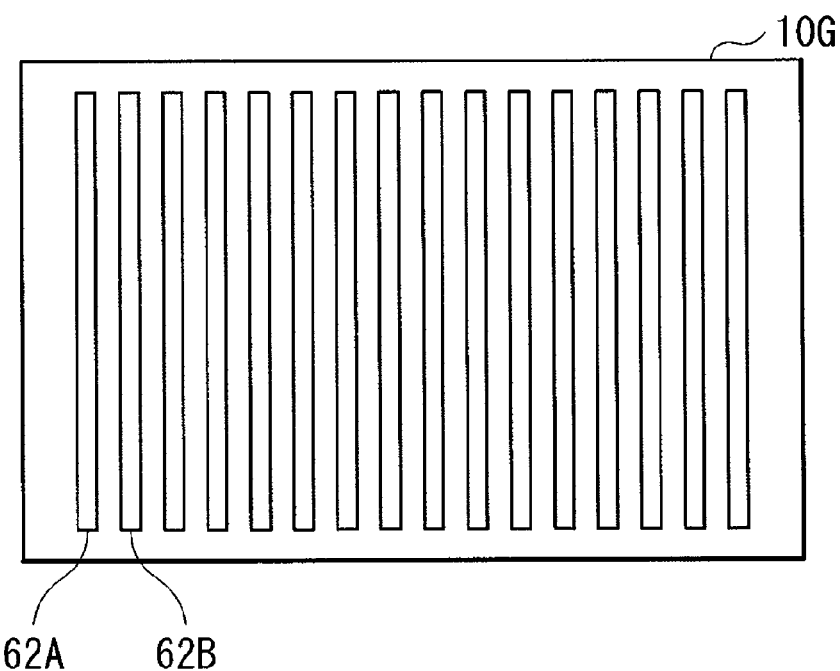

Although the opening-closing sections 11 and 12 in the liquid crystal barrier section 10 are arranged extending in the oblique direction in the above-described embodiment, the arrangement of both sections in not limited thereto. Alternatively, for example, the arrangement of both sections may be that of a step barrier type as shown in FIG. 24A, or the opening-closing sections 11 and 12 may be arranged extending in the Y axis direction as shown in FIG. 24B. An example of the arrangement of the step barrier type is disclosed in Japanese Unexamined Patent Application Publication No. 2004-264762.

Although, for example, the polarizers 316 and 324 are formed on the respective surfaces of the liquid crystal barrier section 10 in this embodiment, the arrangement of the polarizers is not limited thereto. Alternatively, for example, the polarizer on a surface of the liquid crystal barrier section 10 which is closer to the display section 20 may be omitted by commonly using the polarizer 206b in the display section 20.

It is possible to achieve at least the following configurations from the above-described example embodiments and the modifications of the disclosure.

(1) A display device including:
   a display section displaying an image; and
   a barrier section including a plurality of liquid crystal barriers, the liquid crystal barriers each being configured to be switched between an open state and a closed state,
      wherein the barrier section includes
      a barrier electrode being arranged in a region corresponding to the liquid crystal barrier, the barrier electrode including a plurality of sub-electrodes each of which includes a projection portion,
      a common electrode being commonly formed on an entire surface of a region corresponding to the plurality of liquid crystal barriers, and
      a liquid crystal layer being provided between the barrier electrode and the common electrode.
(2) The display device according to (1),
   wherein the barrier section includes a drive substrate including the barrier electrode and projection patterns, the projection patterns each being formed on a support substrate at a portion corresponding to the projection portion, and
   the barrier electrode is formed on the support substrate and the projection patterns.
(3) The display device according to (2),
   wherein the drive substrate further includes
   a plurality of signal lines being formed on a layer different from a layer in which the barrier electrode is formed, the signal lines each transmitting a driving signal,
   a lead-in line being formed on the layer in which the barrier electrode is formed while intersecting one or more signal lines of the signal lines, the lead-in line supplying the barrier electrode with the driving signal, and
   an insulating layer being formed at an intersection of the one or more of signal lines and the lead-in line on a layer provided between the layer on which the signal lines are formed and the layer on which the lead-in line is formed, and
   a material of the projection patterns is same as a material of the insulating layer.
(4) The display device according to any one of (1) to (3),
   wherein the projection portion is formed at a location corresponding to a center of each of the sub-electrodes.
(5) The display device according to any one of (1) to (4),
   wherein adjacent ones of the sub-electrodes are connected to each other in a region corresponding to each of the liquid crystal barriers, and
   a slit is formed between the sub-electrodes connected to each other.
(6) The display device according to any one of (1) to (5),
   wherein the barrier section includes two phase plates being arranged to sandwich the liquid crystal layer.
(7) The display device according to (6),
   wherein the barrier section includes two polarizers being arranged to sandwich the two phase plates and the liquid crystal layer.
(8) The display device according to any one of (1) to (7),
   wherein the barrier section includes a plurality of liquid crystal barriers in a first group, and a plurality of liquid crystal barriers in a second group, the plurality of liquid crystal barriers in the first and second groups extending in a predetermined direction.
(9) The display device according to (8),
   wherein the display device has a plurality of display modes including a three-dimensional image display mode and a two-dimensional image display mode,
   in the three-dimensional image display mode, the display device displays a three-dimensional image by allowing the display section to display a plurality of different perspective images, and allowing the liquid crystal barriers in the first group to be the open state and allowing the liquid crystal barriers in the second group to be the closed state, and in the two-dimensional image display mode, the display device displays a two-dimensional image by allowing the display section to display a single perspective image, and allowing the liquid crystal barriers in the first group and the liquid crystal barriers in the second group to be the open state.

(10) The display device according to (9), wherein the liquid crystal barriers in the first group are classified into a plurality of barrier sub-groups, and in the three-dimensional image display mode, the liquid crystal barriers in the first group are switched between the open state and the closed state in a time-divisional manner for each of the barrier sub-groups.

(11) The display device according to any one of (1) to (10), further including a backlight, wherein the display section is a liquid crystal display section, and the liquid crystal display section is arranged between the backlight and the barrier section.

(12) The display device according to any one of (1) to (10), further including a backlight, wherein the display section is a liquid crystal display section, and the barrier section is arranged between the backlight and the liquid crystal display section.

(13) A barrier device including:

a barrier electrode being arranged in a region corresponding to each of a plurality of liquid crystal barriers which are configured to be switched between an open state and a closed state, the barrier electrode including a plurality of sub-electrodes each of which includes a projection portion;

a common electrode being commonly formed on an entire surface of a region corresponding to the plurality of liquid crystal barriers; and a liquid crystal layer being provided between the barrier electrode and the common electrode.

(14) A method of manufacturing a barrier device, the method including:

forming a drive substrate, the forming a drive substrate including forming a barrier electrode including a plurality of sub-electrodes;

forming a counter substrate; and sealing a liquid crystal layer between the drive substrate and the counter substrate, wherein the forming the drive substrate includes forming a plurality of signal lines on a support substrate, selectively forming an insulating layer, and forming the barrier electrode and a lead-in line on a layer differing from a layer in which the signal lines are formed, the lead-in line being formed from the signal lines to the barrier electrode, and the forming the insulating layer includes forming the insulating layer on an intersecting portion of the signal lines and the lead-in line, and on part of a region corresponding to each sub-electrode.

The present disclosure contains subject matter related to that disclosed in Japanese Priority Patent Application JP 2011-126563 filed in the Japan Patent Office on Jun. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a display section displaying an image; and a barrier section including a plurality of liquid crystal barriers, the liquid crystal barriers each being configured to be switched between an open state and a closed state, wherein the barrier section includes a barrier electrode being arranged in a region corresponding to the liquid crystal barrier, the barrier electrode including a plurality of sub-electrodes each of which includes a projection portion, a common electrode being commonly formed on an entire surface of a region corresponding to the plurality of liquid crystal barriers, and a liquid crystal layer being provided between the barrier electrode and the common electrode.

2. The display device according to claim 1, wherein the barrier section includes a drive substrate including the barrier electrode and projection patterns, the projection patterns each being formed on a support substrate at a portion corresponding to the projection portion, and the barrier electrode is formed on the support substrate and the projection patterns.

3. The display device according to claim 2, wherein the drive substrate further includes a plurality of signal lines being formed on a layer different from a layer in which the barrier electrode is formed, the signal lines each transmitting a driving signal, a lead-in line being formed on the layer in which the barrier electrode is formed while intersecting one or more signal lines of the signal lines, the lead-in line supplying the barrier electrode with the driving signal, and an insulating layer being formed at an intersection of the one or more of signal lines and the lead-in line on a layer provided between the layer on which the signal lines are formed and the layer on which the lead-in line is formed, and a material of the projection patterns is same as a material of the insulating layer.

4. The display device according to claim 1, wherein the projection portion is formed at a location corresponding to a center of each of the sub-electrodes.

5. The display device according to claim 1, wherein adjacent ones of the sub-electrodes are connected to each other in a region corresponding to each of the liquid crystal barriers, and a slit is formed between the sub-electrodes connected to each other.

6. The display device according to claim 1, wherein the barrier section includes two phase plates being arranged to sandwich the liquid crystal layer.

7. The display device according to claim 6, wherein the barrier section includes two polarizers being arranged to sandwich the two phase plates and the liquid crystal layer.

8. The display device according to claim 1, wherein the barrier section includes a plurality of liquid crystal barriers in a first group, and a plurality of liquid crystal barriers in a second group, the plurality of liquid crystal barriers in the first and second groups extending in a predetermined direction.

9. The display device according to claim 8,
wherein the display device has a plurality of display modes including a three-dimensional image display mode and a two-dimensional image display mode,
in the three-dimensional image display mode, the display device displays a three-dimensional image by allowing the display section to display a plurality of different perspective images, and allowing the liquid crystal barriers in the first group to be in the open state and allowing the liquid crystal barriers in the second group to be in the closed state, and
in the two-dimensional image display mode, the display device displays a two-dimensional image by allowing the display section to display a single perspective image, and allowing the liquid crystal barriers in the first group and the liquid crystal barriers in the second group to be in the open state.

10. The display device according to claim 9,
wherein the liquid crystal barriers in the first group are classified into a plurality of barrier sub-groups, and
in the three-dimensional image display mode, the liquid crystal barriers in the first group are switched between the open state and the closed state in a time-divisional manner for each of the barrier sub-groups.

11. The display device according to claim 1, further comprising
a backlight,
wherein the display section is a liquid crystal display section, and
the liquid crystal display section is arranged between the backlight and the barrier section.

12. The display device according to claim 1, further comprising
a backlight,
wherein the display section is a liquid crystal display section, and
the barrier section is arranged between the backlight and the liquid crystal display section.

13. A barrier device comprising:
a barrier electrode being arranged in a region corresponding to each of a plurality of liquid crystal barriers which are configured to be switched between an open state and a closed state, the barrier electrode including a plurality of sub-electrodes each of which includes a projection portion;
a common electrode being commonly formed on an entire surface of a region corresponding to the plurality of liquid crystal barriers; and
a liquid crystal layer being provided between the barrier electrode and the common electrode.

14. A method of manufacturing a barrier device, the method comprising:
forming a drive substrate, the forming a drive substrate including forming a barrier electrode including a plurality of sub-electrodes;
forming a counter substrate; and
sealing a liquid crystal layer between the drive substrate and the counter substrate,
wherein the forming the drive substrate includes
forming a plurality of signal lines on a support substrate,
selectively forming an insulating layer, and
forming the barrier electrode and a lead-in line on a layer differing from a layer in which the signal lines are formed, the lead-in line being formed from the signal lines to the barrier electrode, and
the forming the insulating layer includes forming the insulating layer on an intersecting portion of the signal lines and the lead-in line, and on part of a region corresponding to each sub-electrode.

* * * * *